United States Patent
Miles

(10) Patent No.: US 8,014,059 B2
(45) Date of Patent: Sep. 6, 2011

(54) SYSTEM AND METHOD FOR CHARGE CONTROL IN A MEMS DEVICE

(75) Inventor: Mark W. Miles, San Francisco, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 1603 days.

(21) Appl. No.: 11/267,939

(22) Filed: Nov. 4, 2005

(65) Prior Publication Data

US 2007/0058095 A1    Mar. 15, 2007

Related U.S. Application Data

(60) Continuation-in-part of application No. 11/056,571, filed on Feb. 11, 2005, now Pat. No. 7,379,227, which is a continuation of application No. 09/966,843, filed on Sep. 28, 2001, now Pat. No. 6,867,896, which is a division of application No. 09/056,975, filed on Apr. 8, 1998, now Pat. No. 6,674,562, which is a continuation-in-part of application No. 08/769,947, filed on Dec. 19, 1996, now abandoned, and a continuation-in-part of application No. 08/554,630, (Continued)

(51) Int. Cl.
 *G02B 26/00* (2006.01)
(52) U.S. Cl. ........................................ 359/292
(58) Field of Classification Search .................. 359/290, 359/291, 292, 293, 295, 298, 247, 302, 337.22, 359/346, 370, 398, 498, 577; 372/20, 25, 372/26, 30, 32; 385/14, 16, 24
See application file for complete search history.

(56) References Cited

U.S. PATENT DOCUMENTS 2,534,846 A    12/1950 Ambrose et al.
(Continued)

FOREIGN PATENT DOCUMENTS

EP    0 667 548 A1 *   8/1995
(Continued)

OTHER PUBLICATIONS

Office Action dated Jan. 26, 2009 in U.S. Appl. No. 11/267,819.
(Continued)

*Primary Examiner* — Scott J Sugarman
*Assistant Examiner* — Tuyen Tra
(74) *Attorney, Agent, or Firm* — Knobbe Martens Olson & Bear LLP

(57) ABSTRACT

Light in the visible spectrum is modulated using an array of modulation elements, and control circuitry connected to the array for controlling each of the modulation elements independently, each of the modulation elements having a surface which is caused to exhibit a predetermined impedance characteristic to particular frequencies of light. The amplitude of light delivered by each of the modulation elements is controlled independently by pulse code modulation. Each modulation element has a deformable portion held under tensile stress, and the control circuitry controls the deformation of the deformable portion. Each deformable element has a deformation mechanism and an optical portion, the deformation mechanism and the optical portion independently imparting to the element respectively a controlled deformation characteristic and a controlled modulation characteristic. The deformable modulation element may be a non-metal. The elements are made by forming a sandwich of two layers and a sacrificial layer between them, the sacrificial layer having a thickness related to the final cavity dimension, and using water or an oxygen based plasma to remove the sacrificial layer.

53 Claims, 26 Drawing Sheets

Related U.S. Application Data filed on Nov. 6, 1995, now abandoned, and a continuation-in-part of application No. 08/238,750, filed on May 5, 1994, now Pat. No. 5,835,255, application No. 11/267,939, which is a continuation-in-part of application No. 10/644,312, filed on Aug. 19, 2003, now Pat. No. 7,460,291, which is a continuation-in-part of application No. 10/078,282, filed on Feb. 19, 2002, now Pat. No. 7,042,643, which is a division of application No. 09/991,378, filed on Nov. 21, 2001, now abandoned, which is a continuation of application No. 08/769,947, filed on Dec. 19, 1996, now abandoned, application No. 11/267,939, which is a continuation-in-part of application No. 09/413,222, filed on Oct. 5, 1999, now Pat. No. 7,123,216, which is a continuation-in-part of application No. 08/744,253, filed on Nov. 5, 1996, now Pat. No. 5,986,796, which is a continuation of application No. PCT/US95/05358, filed on May 1, 1995, application No. 11/267,939, which is a continuation-in-part of application No. 10/082,397, filed on Feb. 25, 2002, now Pat. No. 7,126,738, which is a division of application No. 09/378,143, filed on Aug. 20, 1999, now abandoned, and a continuation of application No. 09/413,222, filed on Oct. 5, 1999, now Pat. No. 7,123,216, said application No. 08/744,253 is a continuation of application No. PCT/US95/05358, filed on May 1, 1995, application No. 11/267,939, which is a continuation-in-part of application No. 10/414,594, filed on Apr. 15, 2003, now Pat. No. 7,297,471, and a continuation-in-part of application No. 10/251,196, filed on Sep. 20, 2002, now Pat. No. 7,550,794, and a continuation-in-part of application No. 09/875,401, filed on Jun. 5, 2001, now Pat. No. 7,138,984.

(56) References Cited

U.S. PATENT DOCUMENTS

| | | |
|---|---|---|
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,679,313 A | 7/1972 | Rosenberg |
| 3,701,586 A | 10/1972 | Goetz |
| 3,725,868 A | 4/1973 | Malmer, Jr. et al. |
| 3,728,030 A | 4/1973 | Hawes |
| 3,813,265 A | 5/1974 | Marks |
| 3,955,190 A | 5/1976 | Teraishi |
| 3,955,880 A | 5/1976 | Lierke |
| 4,099,854 A | 7/1978 | Decker et al. |
| 4,190,488 A | 2/1980 | Winters |
| 4,228,437 A | 10/1980 | Shelton |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,408,181 A | 10/1983 | Nakayama |
| 4,425,572 A | 1/1984 | Takafuji et al. |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,498,953 A | 2/1985 | Cook et al. |
| 4,500,171 A | 2/1985 | Penz et al. |
| 4,519,676 A | 5/1985 | te Velde |
| 4,531,126 A | 7/1985 | Sadones |
| 4,560,435 A | 12/1985 | Brown et al. |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,655,554 A | 4/1987 | Armitage |
| 4,662,746 A | 5/1987 | Hornbeck |
| 4,663,083 A | 5/1987 | Marks |
| 4,672,254 A | 6/1987 | Dolat et al. |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,859,060 A | 8/1989 | Katagiri et al. |
| 4,880,493 A | 11/1989 | Ashby et al. |
| 4,896,033 A | 1/1990 | Gautier |
| 4,900,136 A | 2/1990 | Goldburt et al. |
| 4,900,395 A | 2/1990 | Syverson et al. |
| 4,925,259 A | 5/1990 | Emmett |
| 4,952,034 A | 8/1990 | Azusawa et al. |
| 4,954,789 A | 9/1990 | Sampsell |
| 4,956,213 A | 9/1990 | Masuda |
| 4,956,619 A | 9/1990 | Hornbeck |
| 4,963,245 A | 10/1990 | Roxlo |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,034,351 A | 7/1991 | Sun et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,114,226 A | 5/1992 | Goodwin et al. |
| 5,124,834 A | 6/1992 | Cusano et al. |
| 5,136,669 A | 8/1992 | Gerdt |
| 5,142,405 A | 8/1992 | Hornbeck |
| 5,142,414 A * | 8/1992 | Koehler ................ 359/578 |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,170,283 A | 12/1992 | O'Brien et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,198,644 A | 3/1993 | Pfeiffer et al. |
| 5,206,629 A | 4/1993 | DeMond et al. |
| 5,206,632 A | 4/1993 | Dupont et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,262,667 A | 11/1993 | Hirai |
| 5,272,473 A | 12/1993 | Thompson et al. |
| 5,278,652 A | 1/1994 | Urbanus et al. |
| 5,280,277 A | 1/1994 | Hornbeck |
| 5,285,196 A | 2/1994 | Gale |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,315,370 A | 5/1994 | Bulow |

| | | | | | | |
|---|---|---|---|---|---|---|
| 5,323,002 | A | 6/1994 | Sampsell et al. | 5,659,374 A | 8/1997 | Gale, Jr. et al. |
| 5,324,683 | A | 6/1994 | Fitch et al. | 5,665,997 A | 9/1997 | Weaver et al. |
| 5,325,116 | A | 6/1994 | Sampsell | 5,673,139 A | 9/1997 | Johnson |
| 5,326,430 | A | 7/1994 | Cronin et al. | 5,683,591 A | 11/1997 | Offenberg |
| 5,327,286 | A | 7/1994 | Sampsell et al. | 5,703,710 A | 12/1997 | Brinkman et al. |
| 5,331,454 | A | 7/1994 | Hornbeck | 5,710,656 A | 1/1998 | Goosen |
| 5,337,191 | A | 8/1994 | Austin | 5,726,480 A | 3/1998 | Pister |
| 5,339,116 | A | 8/1994 | Urbanus et al. | 5,739,945 A | 4/1998 | Tayebati |
| 5,355,181 | A | 10/1994 | Ashizaki et al. | 5,745,193 A | 4/1998 | Urbanus et al. |
| 5,355,357 | A | 10/1994 | Yamamori et al. | 5,745,281 A | 4/1998 | Yi et al. |
| 5,358,601 | A | 10/1994 | Cathey | 5,771,116 A | 6/1998 | Miller et al. |
| 5,361,383 | A | 11/1994 | Chang et al. | 5,784,189 A | 7/1998 | Bozler et al. |
| 5,365,283 | A | 11/1994 | Doherty et al. | 5,784,190 A | 7/1998 | Worley |
| 5,381,253 | A | 1/1995 | Sharp et al. | 5,784,212 A | 7/1998 | Hornbeck |
| 5,401,983 | A | 3/1995 | Jokerst et al. | 5,793,504 A | 8/1998 | Stoll |
| 5,411,769 | A | 5/1995 | Hornbeck | 5,808,780 A | 9/1998 | McDonald |
| 5,422,310 | A | 6/1995 | Ito | 5,818,095 A | 10/1998 | Sampsell |
| 5,444,566 | A | 8/1995 | Gale et al. | 5,825,528 A | 10/1998 | Goosen |
| 5,446,479 | A | 8/1995 | Thompson et al. | 5,835,255 A | 11/1998 | Miles |
| 5,448,314 | A | 9/1995 | Heimbuch et al. | 5,842,088 A | 11/1998 | Thompson |
| 5,452,024 | A | 9/1995 | Sampsell | 5,912,758 A | 6/1999 | Knipe et al. |
| 5,452,138 | A | 9/1995 | Mignardi et al. | 5,943,158 A | 8/1999 | Ford et al. |
| 5,454,904 | A | 10/1995 | Ghezzo et al. | 5,959,763 A | 9/1999 | Bozler et al. |
| 5,454,906 | A | 10/1995 | Baker et al. | 5,986,796 A | 11/1999 | Miles |
| 5,457,493 | A | 10/1995 | Leddy et al. | 6,028,690 A | 2/2000 | Carter et al. |
| 5,457,566 | A | 10/1995 | Sampsell et al. | 6,031,653 A * | 2/2000 | Wang .......................... 359/247 |
| 5,457,900 | A | 10/1995 | Roy et al. | 6,038,056 A | 3/2000 | Florence et al. |
| 5,459,602 | A | 10/1995 | Sampsell | 6,040,937 A | 3/2000 | Miles |
| 5,459,610 | A | 10/1995 | Bloom et al. | 6,049,317 A | 4/2000 | Thompson et al. |
| 5,461,411 | A | 10/1995 | Florence et al. | 6,061,075 A | 5/2000 | Nelson et al. |
| 5,474,865 | A | 12/1995 | Vasudev | 6,099,132 A | 8/2000 | Kaeriyama |
| 5,489,952 | A | 2/1996 | Gove et al. | 6,100,872 A | 8/2000 | Aratani et al. |
| 5,497,172 | A | 3/1996 | Doherty et al. | 6,113,239 A | 9/2000 | Sampsell et al. |
| 5,497,197 | A | 3/1996 | Gove et al. | 6,147,790 A | 11/2000 | Meier et al. |
| 5,499,037 | A | 3/1996 | Nakagawa et al. | 6,158,156 A | 12/2000 | Patrick |
| 5,499,062 | A | 3/1996 | Urbanus | 6,160,833 A | 12/2000 | Floyd et al. |
| 5,500,635 | A | 3/1996 | Mott | 6,180,428 B1 | 1/2001 | Peeters et al. |
| 5,500,761 | A | 3/1996 | Goossen et al. | 6,201,633 B1 | 3/2001 | Peeters et al. |
| 5,506,597 | A | 4/1996 | Thompson et al. | 6,232,936 B1 | 5/2001 | Gove et al. |
| 5,515,076 | A | 5/1996 | Thompson et al. | 6,243,149 B1 | 6/2001 | Swanson et al. |
| 5,517,347 | A | 5/1996 | Sampsell | 6,282,010 B1 | 8/2001 | Sulzbach et al. |
| 5,523,803 | A | 6/1996 | Urbanus et al. | 6,295,154 B1 | 9/2001 | Laor et al. |
| 5,526,051 | A | 6/1996 | Gove et al. | 6,323,982 B1 | 11/2001 | Hornbeck |
| 5,526,172 | A | 6/1996 | Kanack | 6,335,831 B2 | 1/2002 | Kowarz et al. |
| 5,526,327 | A | 6/1996 | Cordova, Jr. | 6,384,953 B1 | 5/2002 | Russell et al. |
| 5,526,688 | A | 6/1996 | Boysel et al. | 6,407,851 B1 | 6/2002 | Islam et al. |
| 5,535,047 | A | 7/1996 | Hornbeck | 6,447,126 B1 | 9/2002 | Hornbeck |
| 5,548,301 | A | 8/1996 | Kornher et al. | 6,465,355 B1 | 10/2002 | Horsley |
| 5,551,293 | A | 9/1996 | Boysel et al. | 6,466,358 B2 | 10/2002 | Tew |
| 5,552,924 | A | 9/1996 | Tregilgas | 6,473,274 B1 | 10/2002 | Maimone et al. |
| 5,552,925 | A | 9/1996 | Worley | 6,480,177 B2 | 11/2002 | Doherty et al. |
| 5,559,358 | A | 9/1996 | Burns et al. | 6,496,122 B2 | 12/2002 | Sampsell |
| 5,563,398 | A | 10/1996 | Sampsell | 6,545,335 B1 | 4/2003 | Chua et al. |
| 5,567,334 | A | 10/1996 | Baker et al. | 6,548,908 B2 | 4/2003 | Chua et al. |
| 5,570,135 | A | 10/1996 | Gove et al. | 6,549,338 B1 | 4/2003 | Wolverton et al. |
| 5,579,149 | A | 11/1996 | Moret et al. | 6,552,840 B2 | 4/2003 | Knipe |
| 5,581,272 | A | 12/1996 | Conner et al. | 6,574,033 B1 | 6/2003 | Chui et al. |
| 5,583,688 | A | 12/1996 | Hornbeck | 6,589,625 B1 | 7/2003 | Kothari et al. |
| 5,589,852 | A | 12/1996 | Thompson et al. | 6,600,201 B2 | 7/2003 | Hartwell et al. |
| 5,597,736 | A | 1/1997 | Sampsell | 6,606,175 B1 | 8/2003 | Sampsell et al. |
| 5,600,383 | A | 2/1997 | Hornbeck | 6,625,047 B2 | 9/2003 | Coleman, Jr. |
| 5,602,671 | A | 2/1997 | Hornbeck | 6,630,786 B2 | 10/2003 | Cummings et al. |
| 5,606,441 | A | 2/1997 | Florence et al. | 6,632,698 B2 | 10/2003 | Ives |
| 5,608,468 | A | 3/1997 | Gove et al. | 6,643,069 B2 | 11/2003 | Dewald |
| 5,610,438 | A | 3/1997 | Wallace et al. | 6,650,455 B2 | 11/2003 | Miles |
| 5,610,624 | A | 3/1997 | Bhuva | 6,666,561 B1 | 12/2003 | Blakley |
| 5,610,625 | A | 3/1997 | Sampsell | 6,674,090 B1 | 1/2004 | Chua et al. |
| 5,619,059 | A | 4/1997 | Li et al. | 6,674,562 B1 | 1/2004 | Miles et al. |
| 5,619,365 | A | 4/1997 | Rhoades et al. | 6,680,792 B2 | 1/2004 | Miles |
| 5,619,366 | A | 4/1997 | Rhoads et al. | 6,710,908 B2 | 3/2004 | Miles et al. |
| 5,629,790 | A | 5/1997 | Neukermans et al. | 6,741,377 B2 | 5/2004 | Miles |
| 5,633,652 | A | 5/1997 | Kanbe et al. | 6,741,384 B1 | 5/2004 | Martin et al. |
| 5,636,052 | A | 6/1997 | Arney et al. | 6,741,503 B1 | 5/2004 | Farris et al. |
| 5,636,185 | A | 6/1997 | Brewer et al. | 6,747,785 B2 | 6/2004 | Chen et al. |
| 5,638,084 | A | 6/1997 | Kalt | 6,775,174 B2 | 8/2004 | Huffman et al. |
| 5,646,768 | A | 7/1997 | Kaeriyama | 6,778,155 B2 | 8/2004 | Doherty et al. |
| 5,650,881 | A | 7/1997 | Hornbeck | 6,794,119 B2 | 9/2004 | Miles |
| 5,654,741 | A | 8/1997 | Sampsell et al. | 6,811,267 B1 | 11/2004 | Allen et al. |
| 5,657,099 | A | 8/1997 | Doherty et al. | 6,819,469 B1 | 11/2004 | Koba |

| | | | |
|---|---|---|---|
| 6,822,628 B2 | 11/2004 | Dunphy et al. | |
| 6,829,132 B2 | 12/2004 | Martin et al. | |
| 6,853,129 B1 | 2/2005 | Cummings et al. | |
| 6,855,610 B2 | 2/2005 | Tung et al. | |
| 6,859,218 B1 | 2/2005 | Luman et al. | |
| 6,861,277 B1 | 3/2005 | Monroe et al. | |
| 6,862,022 B2 | 3/2005 | Slupe | |
| 6,862,029 B1 | 3/2005 | D'Souza et al. | |
| 6,867,896 B2 | 3/2005 | Miles | |
| 6,870,581 B2 | 3/2005 | Li et al. | |
| 7,072,093 B2 * | 7/2006 | Piehl et al. | 359/290 |
| 7,379,227 B2 | 5/2008 | Miles | |
| 2001/0003487 A1 | 6/2001 | Miles | |
| 2002/0015215 A1 | 2/2002 | Miles | |
| 2002/0021485 A1 | 2/2002 | Pilossof | |
| 2002/0024711 A1 | 2/2002 | Miles | |
| 2002/0051281 A1 | 5/2002 | Ueda et al. | |
| 2002/0054424 A1 | 5/2002 | Miles | |
| 2002/0075555 A1 | 6/2002 | Miles | |
| 2002/0126364 A1 | 9/2002 | Miles | |
| 2002/0149828 A1 | 10/2002 | Miles | |
| 2003/0043157 A1 | 3/2003 | Miles | |
| 2003/0072070 A1 | 4/2003 | Miles | |
| 2003/0202264 A1 | 10/2003 | Weber et al. | |
| 2003/0202265 A1 | 10/2003 | Reboa et al. | |
| 2003/0202266 A1 | 10/2003 | Ring et al. | |
| 2004/0051929 A1 | 3/2004 | Sampsell et al. | |
| 2004/0058532 A1 | 3/2004 | Miles et al. | |
| 2004/0080807 A1 | 4/2004 | Chen et al. | |
| 2004/0145049 A1 | 7/2004 | McKinnell et al. | |
| 2004/0147056 A1 | 7/2004 | McKinnell et al. | |
| 2004/0160143 A1 | 8/2004 | Shreeve et al. | |
| 2004/0174583 A1 | 9/2004 | Chen et al. | |
| 2004/0179281 A1 | 9/2004 | Reboa | |
| 2004/0212026 A1 | 10/2004 | Van Brocklin et al. | |
| 2004/0217378 A1 | 11/2004 | Martin et al. | |
| 2004/0217919 A1 | 11/2004 | Pichl et al. | |
| 2004/0218251 A1 | 11/2004 | Piehl et al. | |
| 2004/0218334 A1 | 11/2004 | Martin et al. | |
| 2004/0218341 A1 * | 11/2004 | Martin et al. | |
| 2004/0227493 A1 * | 11/2004 | Van Brocklin et al. | |
| 2004/0240032 A1 * | 12/2004 | Miles | |
| 2004/0240138 A1 | 12/2004 | Martin et al. | |
| 2004/0245588 A1 * | 12/2004 | Nikkel et al. | |
| 2004/0263944 A1 * | 12/2004 | Miles et al. | |
| 2005/0001828 A1 * | 1/2005 | Martin et al. | |
| 2005/0038950 A1 * | 2/2005 | Adelmann | |
| 2005/0057442 A1 * | 3/2005 | Way | |
| 2005/0068583 A1 * | 3/2005 | Gutkowski et al. | |
| 2005/0069209 A1 * | 3/2005 | Damera-Venkata et al. | |

FOREIGN PATENT DOCUMENTS

| | | | |
|---|---|---|---|
| JP | 05275401 A1 * | 10/1993 | |
| TW | 157313 | * | 5/1991 |
| WO | WO9530924 | * | 11/1995 |
| WO | WO9717628 | * | 5/1997 |
| WO | WO9952006 A2 * | 10/1999 | |
| WO | WO9952006 A3 * | 10/1999 | |
| WO | WO03007049 A1 * | 1/2003 | |
| WO | WO03069413 A1 * | 8/2003 | |
| WO | WO03073151 A1 * | 9/2003 | |
| WO | WO2004006003 A1 * | 1/2004 | |
| WO | WO2004026757 A2 * | 4/2004 | |

OTHER PUBLICATIONS

Office Action dated Mar. 3, 2009 in U.S. Appl. No. 11/432,724.
Office Action mailed Mar. 26, 2008 in U.S. Appl. No. 11/150,683.
Office Action dated Mar. 17, 2008 in U.S. Appl. No. 11/433,294.
Akasaka, "Three-Dimensional IC Trends", Proceedings of IEEE, vol. 74, No. 12, pp. 1703-1714, (Dec. 1986).
Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani K. et al., "Surface micromachined tuneable interferometer array," Sensors and Actuators, pp. 17-23. (1994).
Bass, "Handbook of Optics, vol. I, Fundamentals, Techniques, and Design, Second Edition," McGraw.Hill, Inc., New York, pp. 2.29-2.36 (1995).
Conner, "Hybrid Color Display Using Optical Interference Filter Array," SID Digest, pp. 577-580 (1993).
Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).
Goossen et al., "Possible Display Applications of the Silicon Mechanical Anti-Reflection Switch," Society for Information Display (1994), pp. 1-4.
Goossen et al., "Silicon Modulator Based on Mechanically-Active Anti-Reflection Layer with 1Mbit/sec Capability for Fiber-in-the-Loop Applications," IEEE Photonics Technology Letters, pp. 1119, 1121 (Sep. 1994).
Gosch, "West Germany Grabs the Lead in X-Ray Lithography," Electronics pp. 78-80 (Feb. 5, 1987).
Howard et al., "Nanometer-Scale Fabrication Techniques", VLSI Electronics: Microstructure Science, vol. 5, pp. 145-153 and pp. 166-173 (1982).
Ibbotson et al., "Comparison of $XeF_2$ and F-atom reactions with Si and $SiO_2$," Applied Physics Letters, vol. 44, No. 12, pp. 1129-1131 (Jun. 1984).
Jerman et al., "A Miniature Fabry-Perot Interferometer with a Corrugated Silicon Diaphragm Support", (1990), pp. 140-144.
Johnson "Optical Scanners", Microwave Scanning Antennas, vol. 1, p. 251-261, (1964).
Light over Matter, Circle No. 36 (Jun. 1993), p. 1.
Miles, "A New Reflective FPD Technology Using Interferometric Modulation", Society for Information Display '97 Digest, Session 7.3., pp. 1-4.
Newsbreaks, "Quantum-trench devices might operate at terahertz frequencies", Laser Focus World (May 1993), p. 13.
Oliner et al., "Radiating Elements and Mutual Coupling", Microwave Scanning Antennas, vol. 2, pp. 131-141, (1966).
Raley et al., "A Fabry-Perot Microinterferometer for Visible Wavelengths", IEEE Solid-State Sensor and Actuator Workshop, Jun. 1992, Hilton Head, SC, p. 170-173.
Schnakenberg et al., TMAHW Etchants for Silicon Micromachining. 1991 International Conference on Solid State Sensors and Actuators-Digest of Technical Papers. pp. 815-818.
Sperger et al., "High Performance Patterned All-Dielectric Interference Colour Filter for Display Applications", SID Digest, pp. 81-83, (1994).
Stone, "Radiation and Optics, An Introduction to the Classical Theory", McGraw-Hill, pp. 340-343, (1963).
Walker et al., "Electron-beam-tunable Interference Filter Spatial Light Modulator", Optics Letters vol. 13, No. 5, pp. 345-347, (May 1988).
Williams et al., Etch Rates for Micromachining Processing. Journal of Microelectromechanical Systems, vol. 5, No. 4, pp. 256-259, (Dec. 1996).
Winters et al., The etching of silicon with $XeF_2$ vapor. Applied Physics Letters, vol. 34, No. 1, pp. 70-73, (Jan. 1979).
Winton, "A novel way to capture solar energy", Chemical Week, (May 1985), p. 17-18.
Wu, "Design of a Reflective Color LCD Using Optical Interference Reflectors", ASIA Display '95, pp. 929-931, (Oct. 1995).
Office Action dated Oct. 21, 2008 in U.S. Appl. No. 11/742,271.
Office Action dated Sep. 18, 2008 in U.S. Appl. No. 11/841,795.
Office Action dated Jul. 23, 2008 in U.S. Appl. No. 11/267,819.
Office Action dated Jul. 28, 2008 in U.S. Appl. No. 11/742,271.
Office Action dated Jul. 28, 2008 in U.S. Appl. No. 11/432,724.
Office Action dated Aug. 5, 2008 in U.S. Appl. No. 11/754,229.
Office Action dated Aug. 6, 2008 in U.S. Appl. No. 11/399,681.
Office Action dated Jul. 21, 2008 in U.S. Appl. No. 11/591,928.
Office Action dated Apr. 1, 2010 in U.S. Appl. No. 11/626,792.
Office Action dated Apr. 1, 2010 in U.S. Appl. No. 12/368,136.
Office Action dated Jan. 21, 2010 in U.S. Appl. No. 11/668,973.
Office Action dated Jan. 27, 2010 in U.S. Appl. No. 11/841,726.
Office Action dated Feb. 22, 2010 in U.S. Appl. No. 11/841,780.
Office Action dated Apr. 2, 2010 in U.S. Appl. No. 11/841,795.
Office Action dated Jan. 27, 2010 in U.S. Appl. No. 12/031,603.

Office Action dated May 15, 2009 in U.S. Appl. No. 10/752,140.
Office Action dated May 28, 2009 in U.S. Appl. No. 11/267,819.
Office Action dated Jul. 23, 2009 in U.S. Appl. No. 12/363,671.
Office Action dated May 14, 2009 in U.S. Appl. No. 11/698,721.
Office Action dated Jul. 30, 2009 in U.S. Appl. No. 11/841,780.
Office Action dated Jul. 23, 2009 in U.S. Appl. No. 11/841,795.
Office Action dated Aug. 14, 2009 in U.S. Appl. No. 11/841,833.
Office Action dated Sep. 14, 2009 in U.S. Appl. No. 11/432,724.
Office Action dated Sep. 24, 2009 in U.S. Appl. No. 11/626,792.
Office Action dated Sep. 29, 2009 in U.S. Appl. No. 11/841,752.
Office Action dated Jul. 28, 2009 in U.S. Appl. No. 11/841,810.
Office Action dated Sep. 4, 2009 in U.S. Appl. No. 11/841,820.
Office Action dated Aug. 20, 2009 in U.S. Appl. No. 12/031,603.
Office Action mailed Jun. 24, 2002 in U.S. Appl. No. 09/056,975.
Office Action mailed Oct. 24, 2000 in U.S. Appl. No. 09/056,975.
Office Action mailed Jun. 25, 1999 in U.S. Appl. No. 09/056,975.
Office Action mailed Jun. 6, 2003 in U.S. Appl. No. 10/076,224.
Office Action mailed Jun. 19, 2002 in U.S. Appl. No. 09/966,843.
Office Action mailed Aug. 1, 2007 in U.S. Appl. No. 11/056,571.
Office Action mailed Feb. 8, 2007 in U.S. Appl. No. 11/056,571.
Office Action mailed Aug. 9, 2006 in U.S. Appl. No. 11/056,571.
Office Action mailed Jan. 30, 2007 in U.S. Appl. No. 10/752,140.
Office Action mailed Jun. 28, 2006 in U.S. Appl. No. 10/752,140.
Office Action mailed Jun. 21, 2007 in U.S. Appl. No. 10/752,140.
Office Action mailed Jan. 17, 2007 in U.S. Appl. No. 11/492,535.
Office Action mailed Jun. 25, 2007 in U.S. Appl. No. 11/492,535.
Office Action mailed Jun. 27, 2006 in U.S. Appl. No. 11/192,436.
Office Action mailed Feb. 27, 2007 in U.S. Appl. No. 11/192,436.
Office Action dated Nov. 19, 2007 in U.S. Appl. No. 11/192,436.
Office Action mailed Sep. 21, 2007 in U.S. Appl. No. 11/150,683.
Office Action mailed Mar. 15, 2007 in U.S. Appl. No. 11/150,683.
Office Action mailed Sep. 21, 2006 in U.S. Appl. No. 11/150,683.
Office Action mailed Apr. 13, 2007 in U.S. Appl. No. 11/432,724.
Office Action mailed Sep. 11, 2007 in U.S. Appl. No. 11/432,724.
Office Action dated Dec. 21, 2007 in U.S. Appl. No. 11/432,724.
Office Action dated Feb. 1, 2008 in U.S. Appl. No. 11/754,229.
Office Action mailed Jan. 30, 2007 in U.S. Appl. No. 11/517,721.
Office Action mailed May 4, 2007 in U.S. Appl. No. 11/591,928.
Office Action mailed Oct. 22, 2007 in U.S. Appl. No. 11/591,928.
Office Action dated Jan. 17, 2008 in U.S. Appl. No. 11/591,928.
Office Action dated Jan. 2, 2008 in U.S. Appl. No. 11/492,535.
Office Action dated Dec. 14, 2007 in U.S. Appl. No. 10/752,140.
Office Action dated Dec. 13, 2007 in U.S. Appl. No. 11/742,271.
Office Action dated Apr. 28, 2006 in Korean Pat. App. No. 10-2000-7011227.
Official Letter received Mar. 21, 2000 in R.O.C. App. No. 088105551.
Office Action received May 25, 2001 in R.O.C. App. No. 089113021.
ISR for PCT/US99/07271 filed Apr. 1, 1999, pp. 1-10.
WO for PCT/US99/07271 filed Apr. 1, 1999, pp. 1-11.
IPER for PCT/US99/07271 filed Apr. 1, 1999, pp. 1-13.
Office Action dated Nov. 17, 2009 in U.S. Appl. No. 11/267,819.
Office Action dated Dec. 31, 2009 in U.S. Appl. No. 12/363,671.
Office Action dated Dec. 10, 2009 in U.S. Appl. No. 11/841,741.
Office Action dated Nov. 12, 2009 in U.S. Appl. No. 11/698,721.
Office Action dated Apr. 21, 2010 in U.S. Appl. No. 11/841,820.
Office Action dated Jul. 23, 2010 in U.S. Appl. No. 12/031,603.
Office Action dated Aug. 24, 2010 in U.S. Appl. No. 11/742,271.
Office Action dated Nov. 30, 2010 in U.S. Appl. No. 11/626,792.
Office Action dated Jan. 26, 2011 in U.S. Appl. No. 12/908,846.
Office Action dated Oct. 8, 2010 in U.S. Appl. No. 11/841,795.
Office Action dated Jan. 24, 2011 in U.S. Appl. No. 12/031,603.

* cited by examiner eq. 1
$$T = \frac{T_a T_b}{[1-(R_a^- R_b^+)^{1/2}]^2} \left[1 + \frac{4R_a^- R_b^+}{[1-(R_a^- R_b^+)^{1/2}]^2} \sin^2\left(\frac{\phi_a + \phi_b}{2} - \delta\right)\right]^{-1}$$

eq. 2
$$\delta = (2\pi n_s d_s \cos\theta_s)/\lambda_s \qquad \text{phase thickness}$$

eq. 3
$$T = T_b \qquad \text{for } T_a \text{ approaching 0}$$

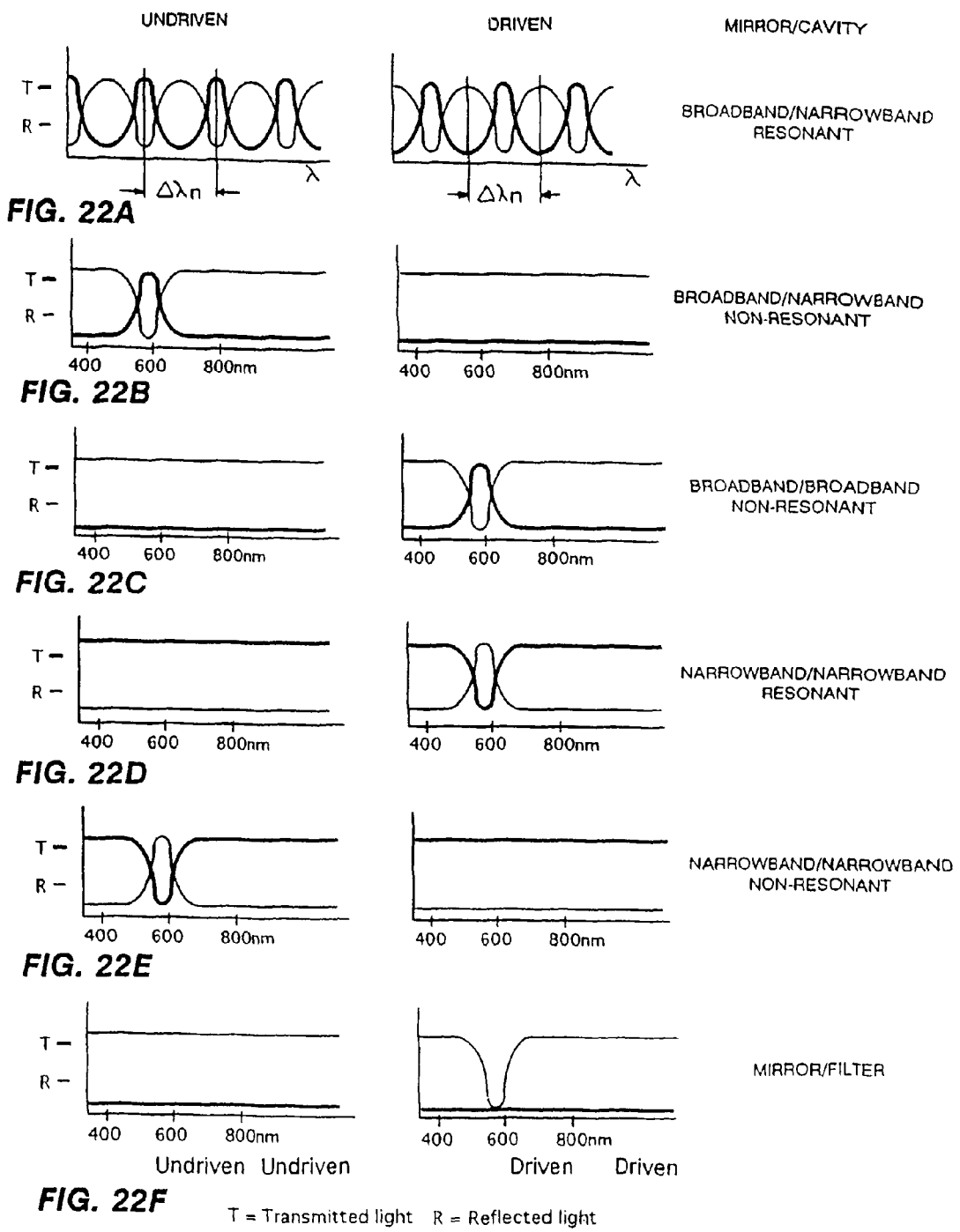

SYSTEM AND METHOD FOR CHARGE CONTROL IN A MEMS DEVICE

CROSS-REFERENCE TO RELATED APPLICATIONS

This application is a continuation-in-part of U.S. patent application Ser. No. 11/056,571, filed Feb. 11, 2005 now U.S. Pat. No. 7,379,227, which is a continuation of U.S. patent application Ser. No. 09/966,843, filed Sep. 28, 2001 (now U.S. Pat. No. 6,867,896), which is a divisional of U.S. patent application Ser. No. 09/056,975, filed Apr. 8, 1998 (now U.S. Pat. No. 6,674,562), which is a continuation-in-part of:
  (1) U.S. patent application Ser. No. 08/769,947, filed Dec. 19, 1996 (now abandoned),
  (2) U.S. patent application Ser. No. 08/554,630, filed Nov. 6, 1995 (now abandoned), and
  (3) U.S. patent application Ser. No. 08/238,750, filed May 5, 1994 (now U.S. Pat. No. 5,835,255).

This application is also a continuation-in-part of U.S. patent application Ser. No. 10/644,312, filed Aug. 19, 2003 now U.S. Pat. No. 7,460,291, which is a continuation-in-part of U.S. patent application Ser. No. 10/078,282, filed Feb. 19, 2002 now U.S. Pat. No. 7,042,643, which is a divisional of U.S. patent application Ser. No. 09/991,378, filed Nov. 21, 2001 now abandoned, which is a continuation of U.S. patent application Ser. No. 08/769,947, filed Dec. 19, 1996 now abandoned.

This application is also a continuation-in-part of U.S. patent application Ser. No. 09/413,222, filed Oct. 5, 1999 now U.S. Pat. No. 7,123,216, which is a continuation-in-part of U.S. patent application Ser. No. 08/744,253, filed Nov. 5, 1996 (now U.S. Pat. No. 5,986,796), which is a continuation of PCT/US95/05358, filed May 1, 1995.

This application is also a continuation-in-part of U.S. application Ser. No. 10/082,397, filed Feb. 25, 2002 now U.S. Pat. No. 7,126,738 (published as U.S. Patent Pub. No. 2003-0072070), which is a divisional application of U.S. application Ser. No. 09/378,143, filed on Aug. 20, 1999 (now abandoned). The disclosure of the prior application is considered part of, and is incorporated by reference in, the disclosure of this application. U.S. application Ser. No. 10/082,397 is also a continuation of co-pending U.S. patent application Ser. No. 09/413,222, filed Oct. 5, 1999, which is a continuation-in-part of U.S. patent application Ser. No. 08/744,253, filed Nov. 5, 1996 (now U.S. Pat. No. 5,986,796), which is a continuation of International Application PCT/US95/05358, filed May 1, 1995.

This application is also a continuation-in-part of U.S. patent application Ser. No. 10/414,594, filed Apr. 15, 2003 now U.S. Pat. No. 7,297,471.

This application is also a continuation-in-part of U.S. patent application Ser. No. 10/251,196, filed Sep. 20, 2002 now U.S. Pat. No. 7,550,794 (published as U.S. Patent Pub. No. 2004-0058532).

This application is also a continuation-in-part of U.S. patent application Ser. No. 09/875,401, filed Jun. 5, 2001 now U.S. Pat. No. 7,138,984.

The disclosures of all the above-referenced prior applications, publications, and patents are considered part of the disclosure of this application, and are incorporated by reference herein.

This application hereby incorporates by reference all subject matter disclosed in U.S. Pat. No. 6,650,455, issued on Nov. 18, 2003, U.S. Pat. No. 6,680,792, issued on Jan. 20, 2004, and U.S. Pat. No. 6,710,908, issued on Mar. 23, 2004.

BACKGROUND

This invention relates to visible spectrum (including ultraviolet and infrared) modulator arrays.

Visible spectrum modulator arrays, such as backlit LCD computer screens, have arrays of electro-optical elements corresponding to pixels. Each element may be electronically controlled to alter light which is aimed to pass through the element. By controlling all of the elements of the array, black and white or, using appropriate elements, color images may be displayed. Non-backlit LCD arrays have similar properties but work on reflected light. These and other types of visible spectrum modulator arrays have a wide variety of other uses.

SUMMARY OF THE INVENTION

In general, in one aspect, the invention features modulation of light in the visible spectrum using an array of modulation elements, and control circuitry connected to the array for controlling each of the modulation elements independently, each of the modulation elements having a surface which is caused to exhibit a predetermined impedance characteristic to particular frequencies of light.

Implementations of the invention may include the following features. The surface may include antennas configured to interact with selected frequencies of light, or the surface may be a surface of an interference cavity. The impedance characteristic may be reflection of particular frequencies of light, or transmission of particular frequencies of light. Each of the modulation elements may be an interference cavity that is deformable to alter the cavity dimension. The interference cavity may include a pair of cavity walls (e.g., mirrors) separated by a cavity dimension. One of the mirrors may be a broadband mirror and the other of the mirrors may be a narrow band mirror. Or both of the mirrors may be narrow band mirrors, or both of the mirrors may be broad band, non-metallic mirrors. The cavity may have a cavity dimension that renders the cavity resonant with respect to light of the frequency defined by the spectral characteristics of the mirrors and intrinsic cavity spacing in an undeformed state. One of the mirrors may be a hybrid filter. One (or both) of the walls may be a dielectric material, a metallic material, or a composite dielectric/metallic material. The cavity may be deformable by virtue of a wall that is under tensile stress. The control circuitry may be connected for analog control of the impedance to light of each element. The analog control may be control of the degree of deformity of the deformable wall of the cavity.

The predetermined impedance characteristic may include reflection of incident electromagnetic radiation in the visible spectrum, e.g., the proportion of incident electromagnetic radiation of a given frequency band that is, on average, reflected by each of the modulation elements. The modulation element may be responsive to a particular electrical condition to occupy either a state of higher reflectivity or a state of lower reflectivity, and the control circuitry may generate a stream of pulses having a duty cycle corresponding to the proportion of incident radiation that is reflected and places the modulation element in the higher state of reflectivity during each the pulse and in the lower state of reflectivity in the intervals between the pulses. The characteristic may include emission of electromagnetic radiation in the visible spectrum. The characteristic may include the amount of electromagnetic radiation in the visible spectrum that is emitted, on average, by the antennas. The characteristic may be incident electromagnetic radiation in the visible spectrum. The modulation elements may include three sub-elements each associated with one of three colors of the visible spectrum. The modulation element may be responsive to a particular electrical condition to occupy either a state of higher transmissivity or a state of lower transmissivity, and the control circuitry may generate a stream of pulses having a duty cycle corresponding to the proportion of incident radiation that is transmitted and places the modulation element in the higher state of transmissivity during each the pulse and in the lower state of transmissivity in the intervals between the pulses. The characteristic may include the proportion of incident electromagnetic radiation of a given frequency band that is, on average, transmitted by each of the modulation elements.

The visible spectrum may include ultraviolet frequencies, or infrared frequencies.

In general, in another aspect of the invention, the control circuitry may be connected to the array for controlling the amplitude of light delivered by each of the modulation elements independently by pulse code modulation.

In general, in another aspect, the invention features a modulation element having a deformable portion held under tensile stress, and control circuitry connected to control the deformation of the deformable portion.

Implementations of the invention may include the following features. The modulation element may be self-supporting, or held on separate supports. The deformable portion may be a rectangular membrane supported along two opposite edges by supports which are orthogonal to the membrane. The deformable portion, under one mode of control by the control circuitry, may be collapsed onto a wall of the cavity. The control circuitry controls the deformable portion by signals applied to the modulation element, and the deformation of the control portion may be subject to hysteresis with respect to signals applied by the control circuitry.

In general, in another aspect, the invention features modulating light in the visible spectrum using a deformable modulation element having a deformation mechanism and an optical portion, the deformation mechanism and the optical portion independently imparting to the element respectively a controlled deformation characteristic and a controlled modulation characteristic.

Implementations of the invention may include the following features. The deformation mechanism may be a flexible membrane held in tensile stress, and the optical portion may be formed on the flexible membrane. The optical portion may be a mirror. The mirror may have a narrow band, or a broad band, or include a hybrid filter.

In general, in another aspect, the invention broadly features a non-metal deformable modulation element.

In general, in another aspect, the invention features a process for making cavity-type modulation elements by forming a sandwich of two layers and a sacrificial layer between them, the sacrificial layer having a thickness related to the final cavity dimension, and using water or an oxygen based plasma to remove the sacrificial layer.

Among the advantages of the invention are the following.

Very high-resolution, full-color images are produced using relatively little power. The embodiment which senses the image incident on the array has relatively low noise. Their color response characteristics are tunable by selection of the dimensions of the antennas. The antenna or cavity embodiments are useful in portable, low power, full color displays, especially under high ambient light conditions. Phase controlled reflective embodiments are useful in passive light scanning such as optical disk readers without moving parts.

The emissive embodiments also could be used as display devices especially in low-ambient-light conditions.

Because of the dielectric materials used in some embodiments, the devices have the advantage of being extremely light efficient, making them especially appropriate for high intensity projection displays, and reducing or eliminating the need for backlighting in low ambient light applications. In addition, more accurate color representations are possible, as well as designs optimized for the IR and UV. Mechanical hysteresis precludes the need for active drivers, and this coupled with their geometric simplicity and monolithic nature brings defect losses down significantly. The devices are also exceptionally fast, low power, and non-polarizing. The fact that they can be reflective and/or transmissive enhances their flexibility.

The process for fabrication as represented in some embodiments relies on benign chemicals, minimizing waste disposal problems, and facilitating the fabrication of devices on a variety of substrates (e.g., plastics or integrated circuits) using a larger variety of materials. Devices on plastic substrates have the potential of being extremely inexpensive. All of the manufacturing technologies used are mature, further reducing manufacturing costs.

Other advantages and features of the invention will become apparent from the following description and from the claims.

DESCRIPTION

FIGS. 15, 16, 17, 18, and 19 are top views of alternative dipole arrangements.

FIGS. 20A through 20D are perspective views of a cavity device.

Figure 21A:
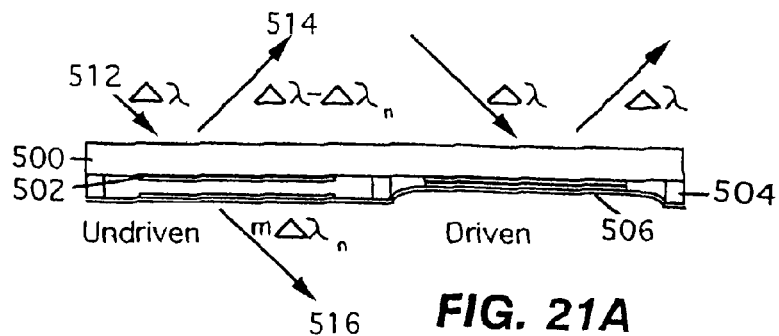
Figure 21B:
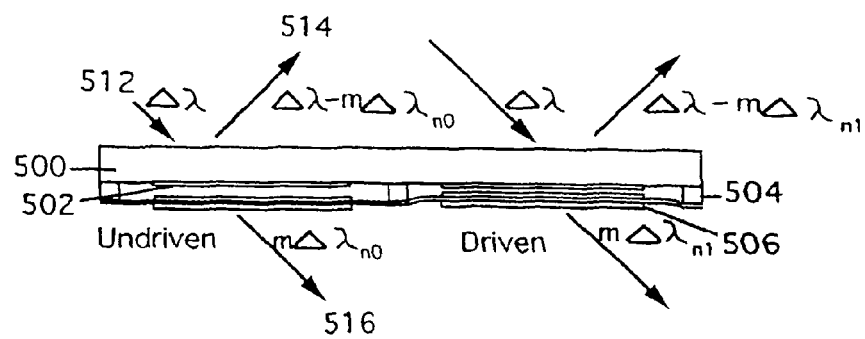

FIGS. 21A and 21B are side views of the cavity device.

FIGS. 22A through 22F are graphs of frequency responses of the cavity device in different states.

Figure 23A:
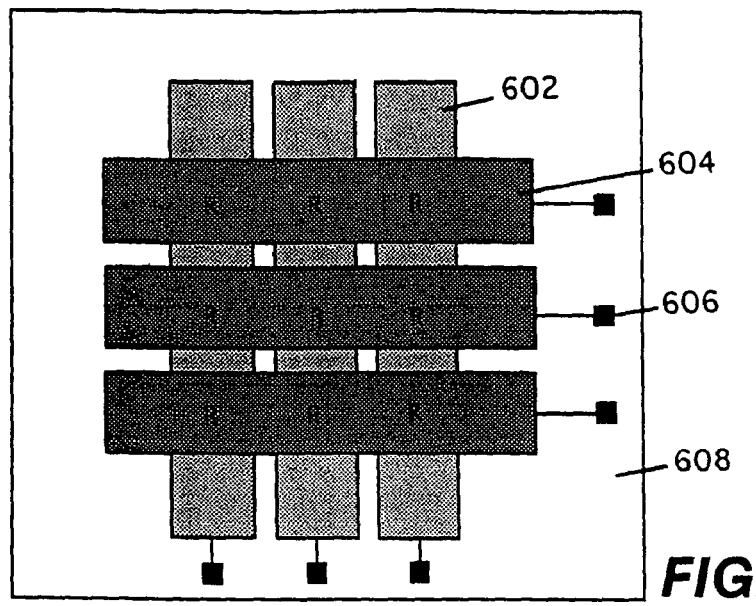
Figure 23B:
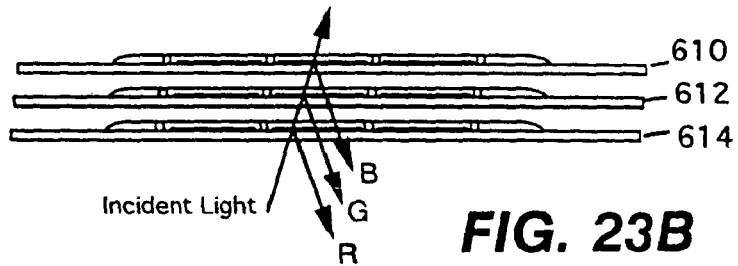

FIGS. 23A and 23B are top and cutaway side views, respectively, of a display.

Figure 23C:
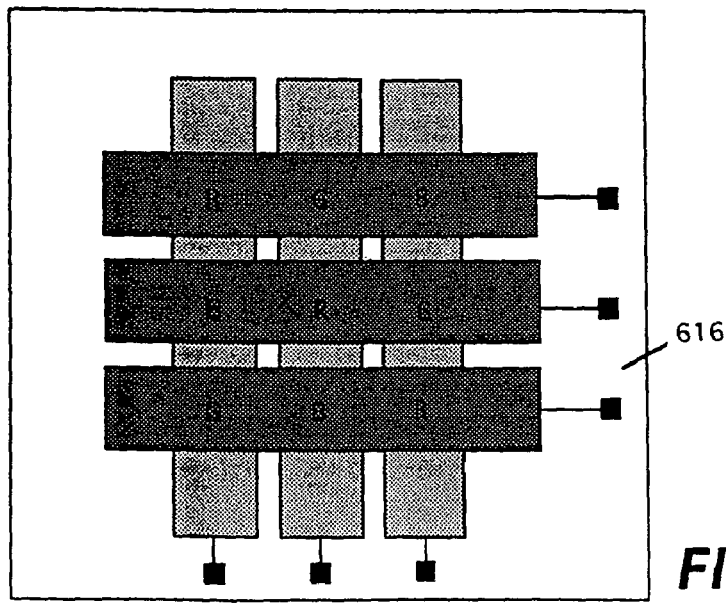
Figure 23D:
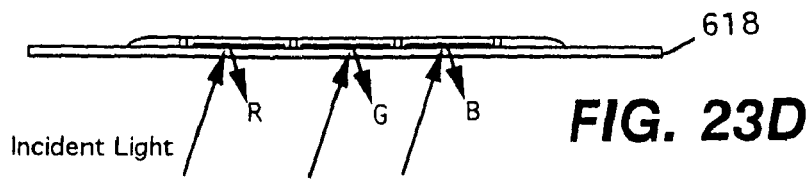

FIGS. 23C and 23D are top and cutaway side views, respectively, of another display.

Figure 24A:
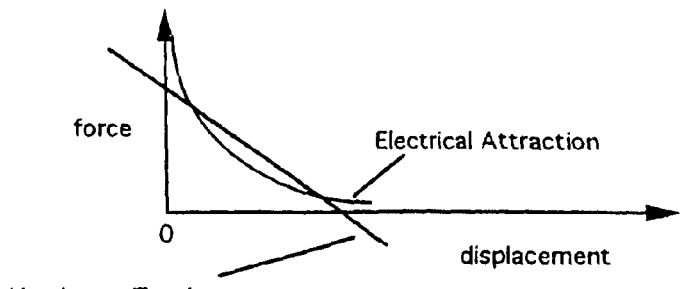

FIG. 24A is a graph of an electromechanical response of the cavity device.

Figure 24B:
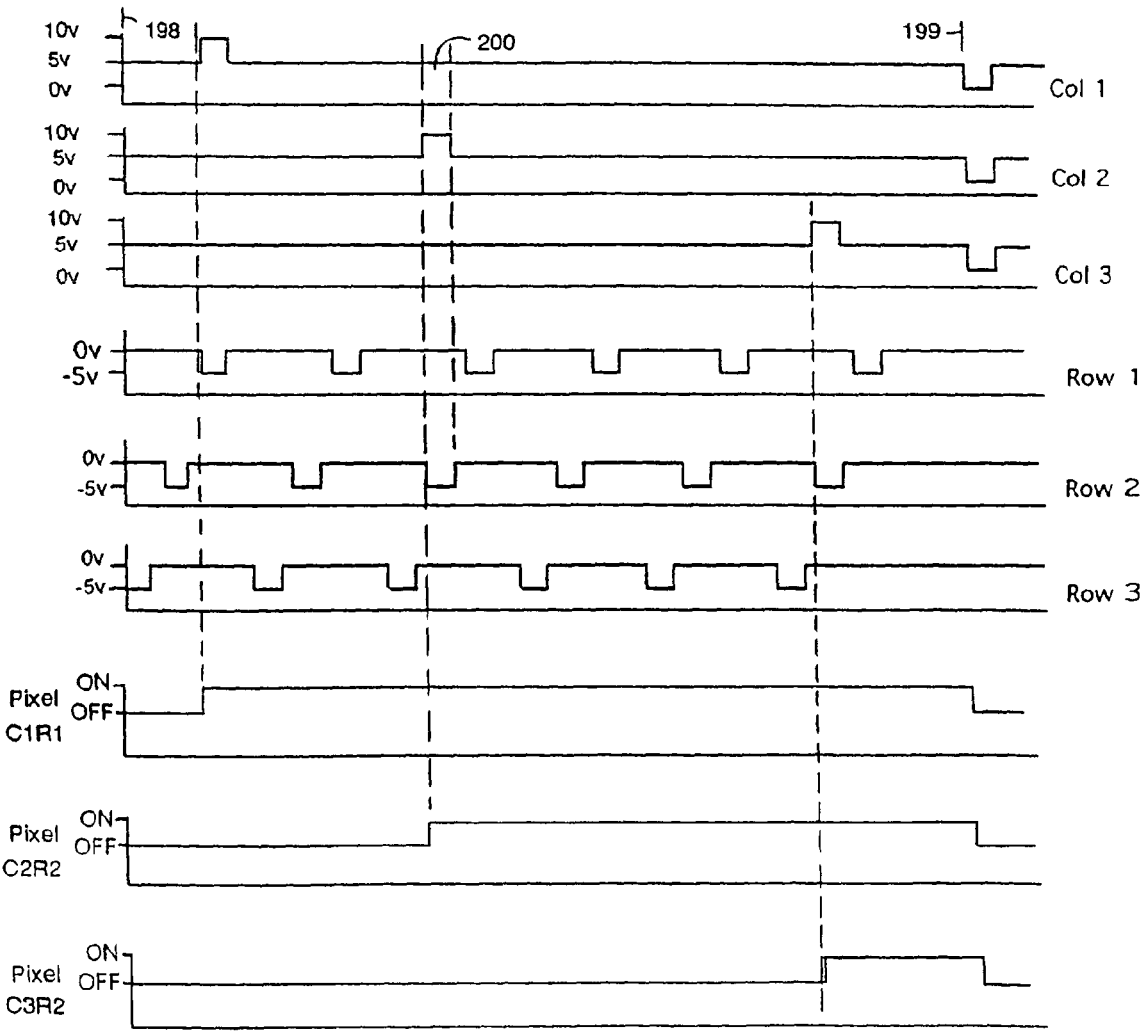

FIG. 24B is a graph of an addressing and modulation scheme for a display.

FIGS. 25A through 25N and FIGS. 26A through 26K are perspective views of the device during assembly.

Figure 27A:
Figure 27B:
Figure 27C:
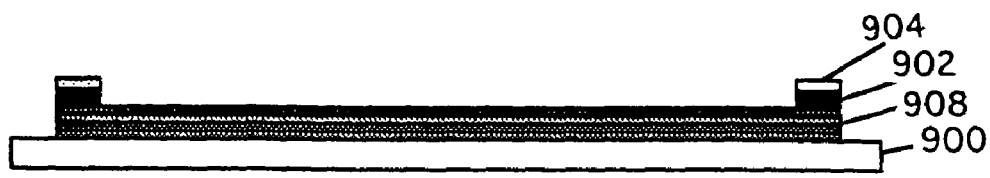

FIGS. 27A through 27C are side views of dielectric mirrors.

Figure 27D:
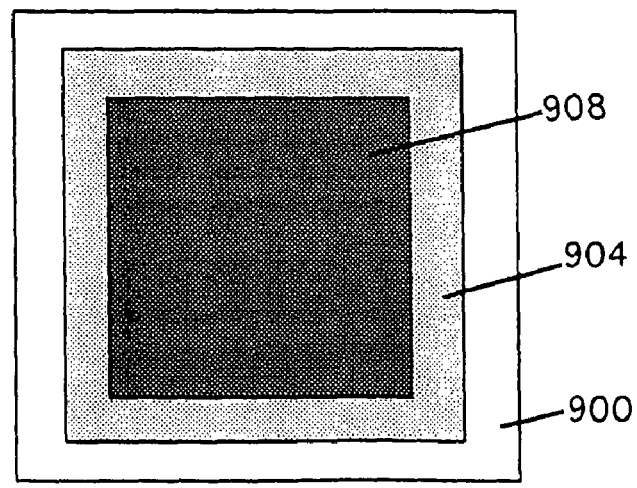

FIG. 27D is a top view of a dielectric mirror.

Figure 28A:
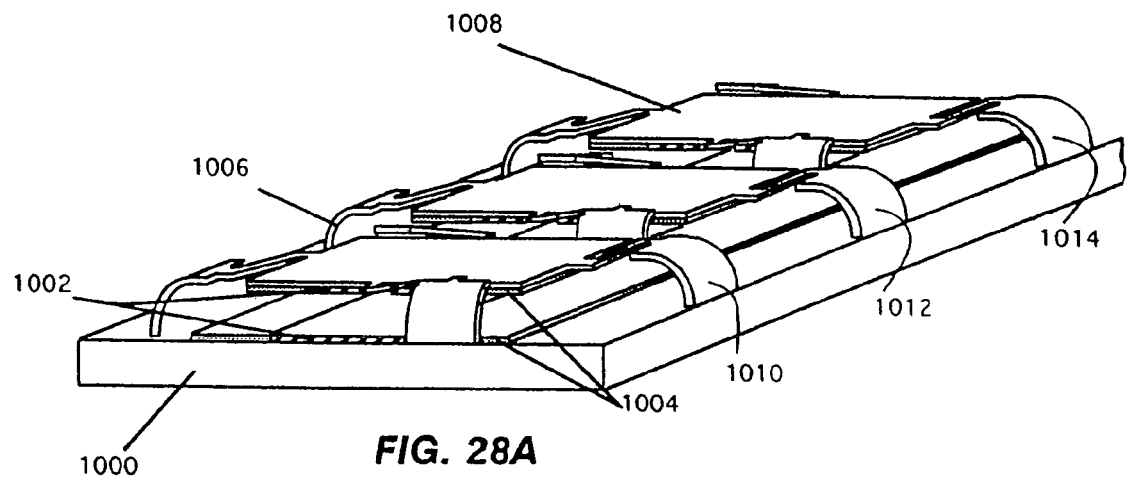
Figure 28B:
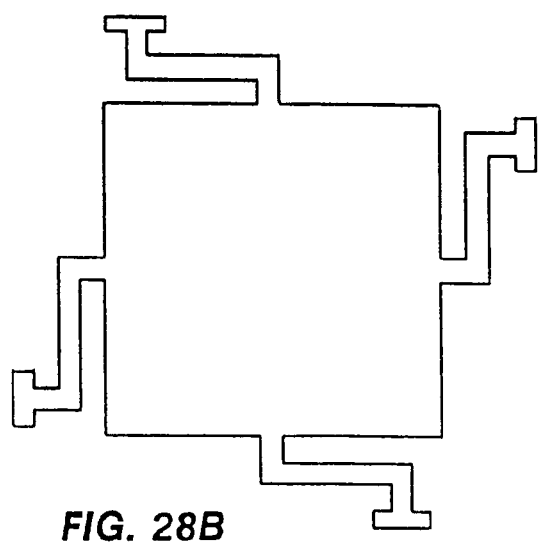

FIGS. 28A, 28B are perspective and top views of a linear tunable filter.

Figure 29A:
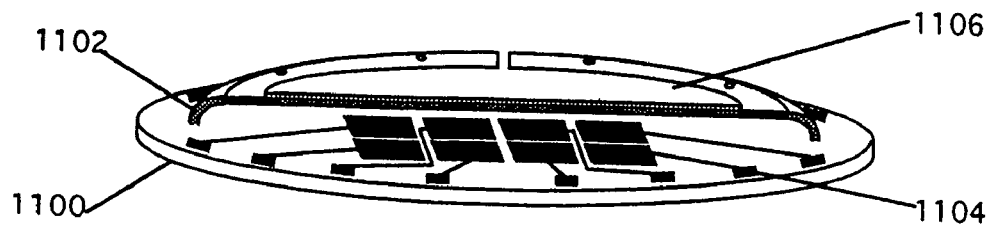
Figure 29B:
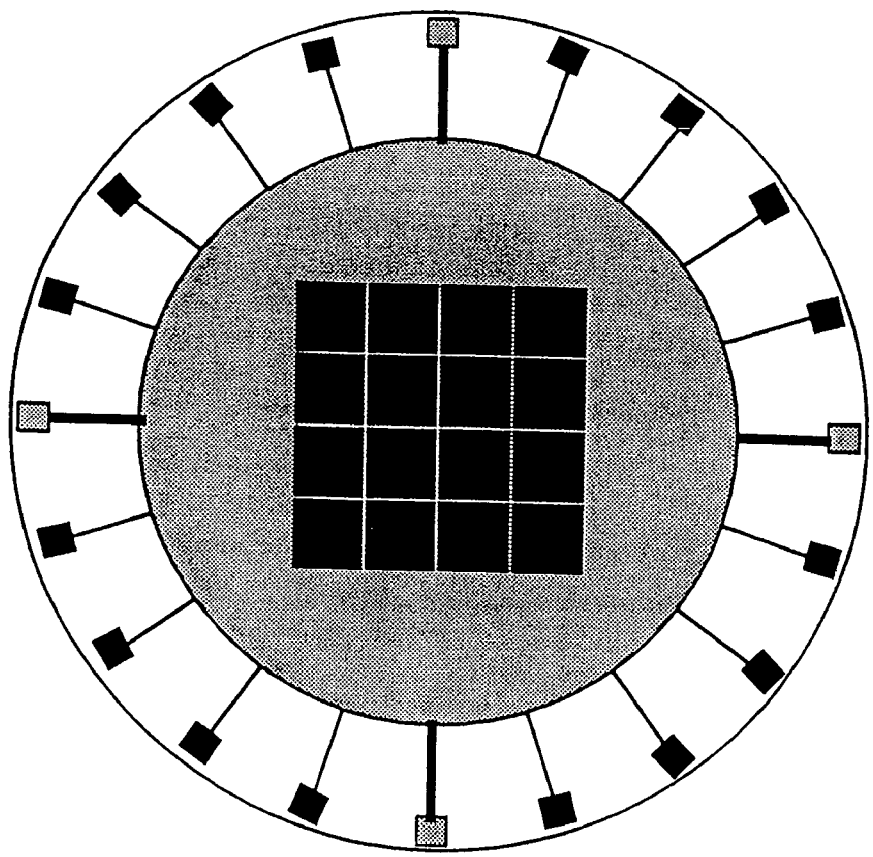

FIGS. 29A, 29B are perspective and top views of a deformable mirror.

Figure 1:
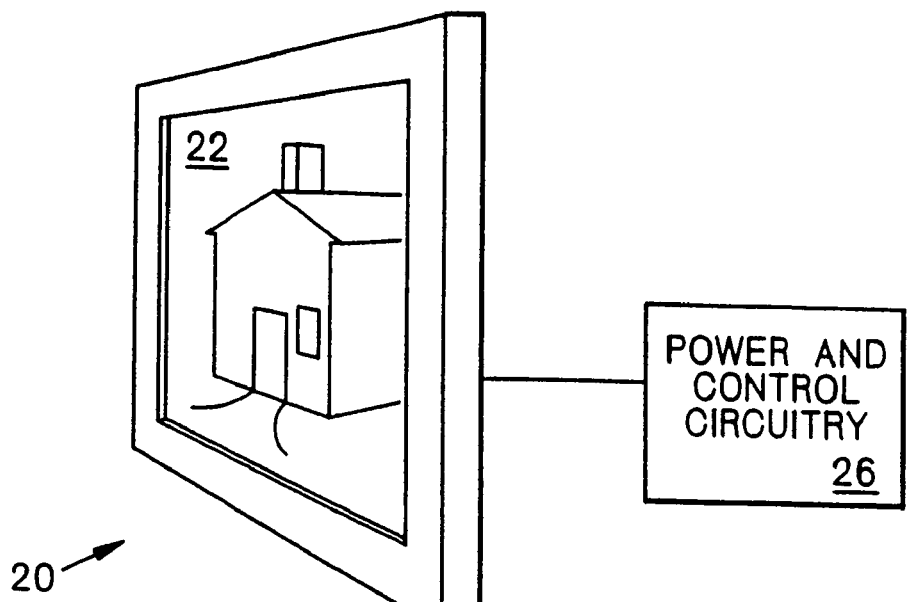
FIG. 1 is a perspective view of a display device.

Referring to FIG. 1, device 20 includes a screen 22 for displaying or sensing a high resolution color image (or a succession of color images) under control of power and control circuitry 26. The image is made up of a densely packed rectangular array of tiny individual picture elements (pixels) each having a specific hue and brightness corresponding to the part of the image represented by the pixel. The pixel density of the image depends on the fabrication process used but could be on the order of 100,000 pixels per square centimeter.

Figure 2:
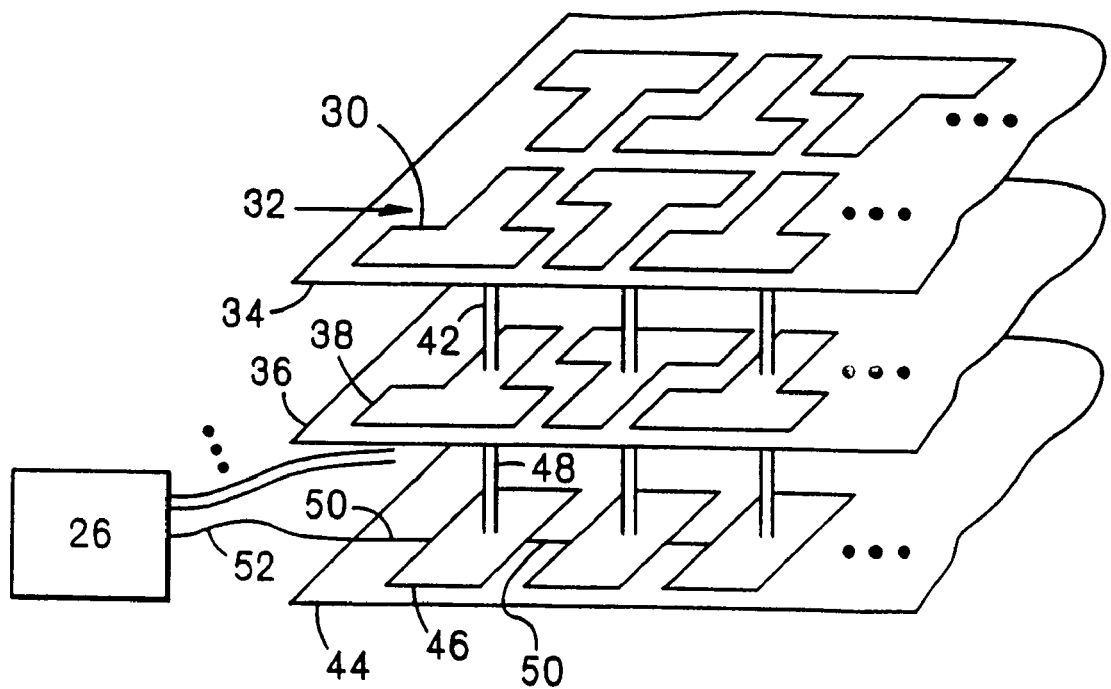
FIG. 2 is a perspective schematic exploded view of a representative portion of the screen of FIG. 1.

Referring to FIG. 2, each pixel is generated by one so-called tri-dipole 30. The boundary of each tri-dipole is T-shaped. The tri-dipoles are arranged in rows 32 in an interlocking fashion with the "Ts" of alternating tri-dipoles oriented in one direction and the "Ts" of intervening tri-dipoles along the same row oriented in the opposite direction. The rows together form a two-dimensional rectangular array of tri-dipoles (corresponding to the array of pixels) that are arranged on a first, external layer 34 of screen 22. The array may be called an electrically alterable optical planar array, or a visible spectrum modulator array.

On a second, internal layer 36 of screen 22 so-called tri-busses 38 (shown as T-shaped blocks in FIG. 2) are arranged in an interlocking two-dimensional array 40 corresponding to the layout of the tri-dipoles on layer 34 above. Each tri-dipole 30 is connected to its corresponding tri-bus 38 by a multi-conductor link 42 running from layer 34 to layer 36 in a manner described below.

On a third, base layer 44 of screen 22 a set of circuit modules 46 are arranged in a two-dimensional rectangular array corresponding to the layouts of the tri-dipoles and tri-busses. Each circuit module 46 is connected to its corresponding tri-bus 38 by a six-conductor link 48 running from layer 36 to layer 44 in a manner described below.

Each circuit module 46 electronically controls the optical characteristics of all of the antennas of its corresponding tri-dipole 30 to generate the corresponding pixel of the image on screen 22. Circuit modules 46 are connected, via conductors 50 running along layer 44, to an edge of layer 44. Wires 52 connect the conductors 50 to control and power circuitry 26 which coordinates all of the circuit modules 46 to generate the entire image.

Figure 3:
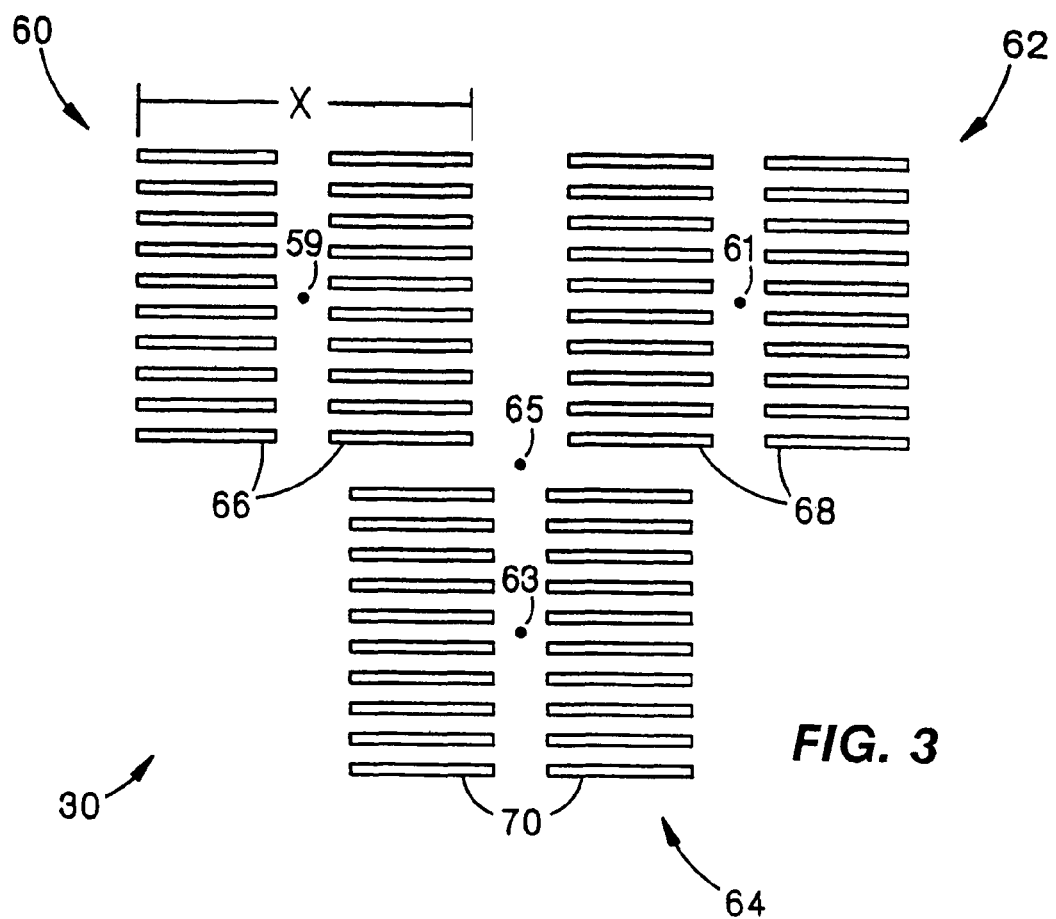
FIG. 3 is an enlarged top view of a tri-dipole of FIG. 2.

Referring to FIG. 3, each tri-dipole 30 has three dipole sections 60, 62, 64. The center points 59, 61, 63 of the three sections are arranged at 120 degree intervals about a point 65 at the center of tri-dipole 30. Each section 60, 62, 64 consists of a column of dipole antennas 66, 68, 70, respectively, only ten dipole antennas are shown in each section in FIG. 3, but the number could be larger or smaller and would depend on, e.g., the density with which control circuits 46 can be fabricated, the tradeoff between bandwidth and gain implied by the spacing of the antennas, and the resistive losses of the conductors that connect the antennas to the control circuit 46. Only the two arms of each dipole antenna are exposed on layer 34, as shown in FIG. 3. The dipole antennas of a given section all have the same dimensions corresponding to a particular resonant wavelength (color) assigned to that section. The resonant wavelengths for the three sections 60, 62, 64 are respectively 0.45 microns (blue), 0.53 microns (green), and 0.6 microns (red).

Figure 4:
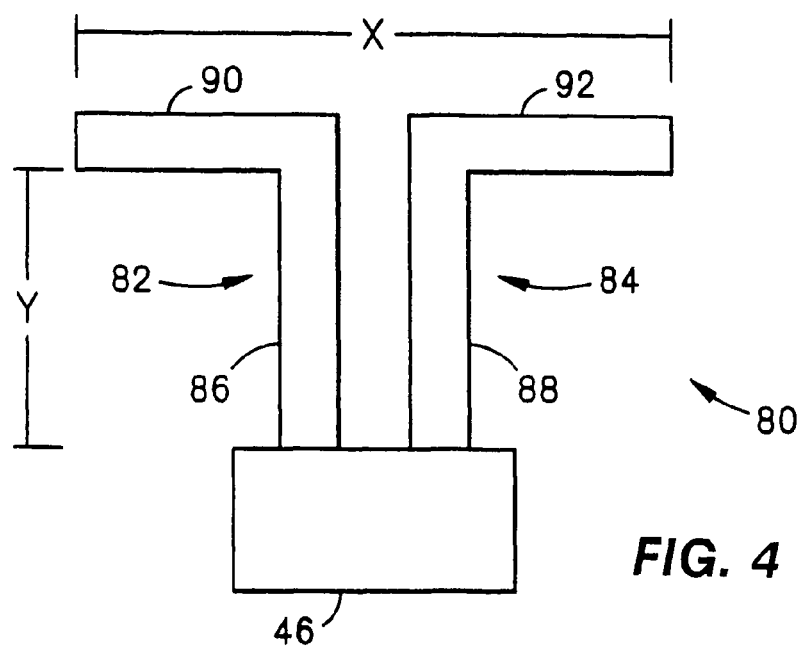
FIG. 4 is a schematic view of a single dipole antenna of FIG. 3.

Referring to FIG. 4, each dipole antenna 80 schematically includes two Ls 82, 84 respectively made up of bases 86, 88, and arms 90, 92. The bases of each antenna 80 are electrically connected to the corresponding circuit module 46. The span (X) of arms 90, 92 is determined by the desired resonant wavelength of dipole antenna 80; for example, for a resonant wavelength of lambda, X would be lambda/2. Dipole antennas 66, 68, 70 have X dimensions of 0.225 microns (lambda$_1$/2), 0.265 microns (lambda$_2$/2), and 0.3 microns (lambda$_3$/2), respectively. The effective length (Y) of bases 86, 88 from arms 90, 92 to circuit module 46 is also a function of the dipole antenna's resonant wavelength; for a resonant wavelength of lambda, Y is a multiple of lambda.

Figure 5:
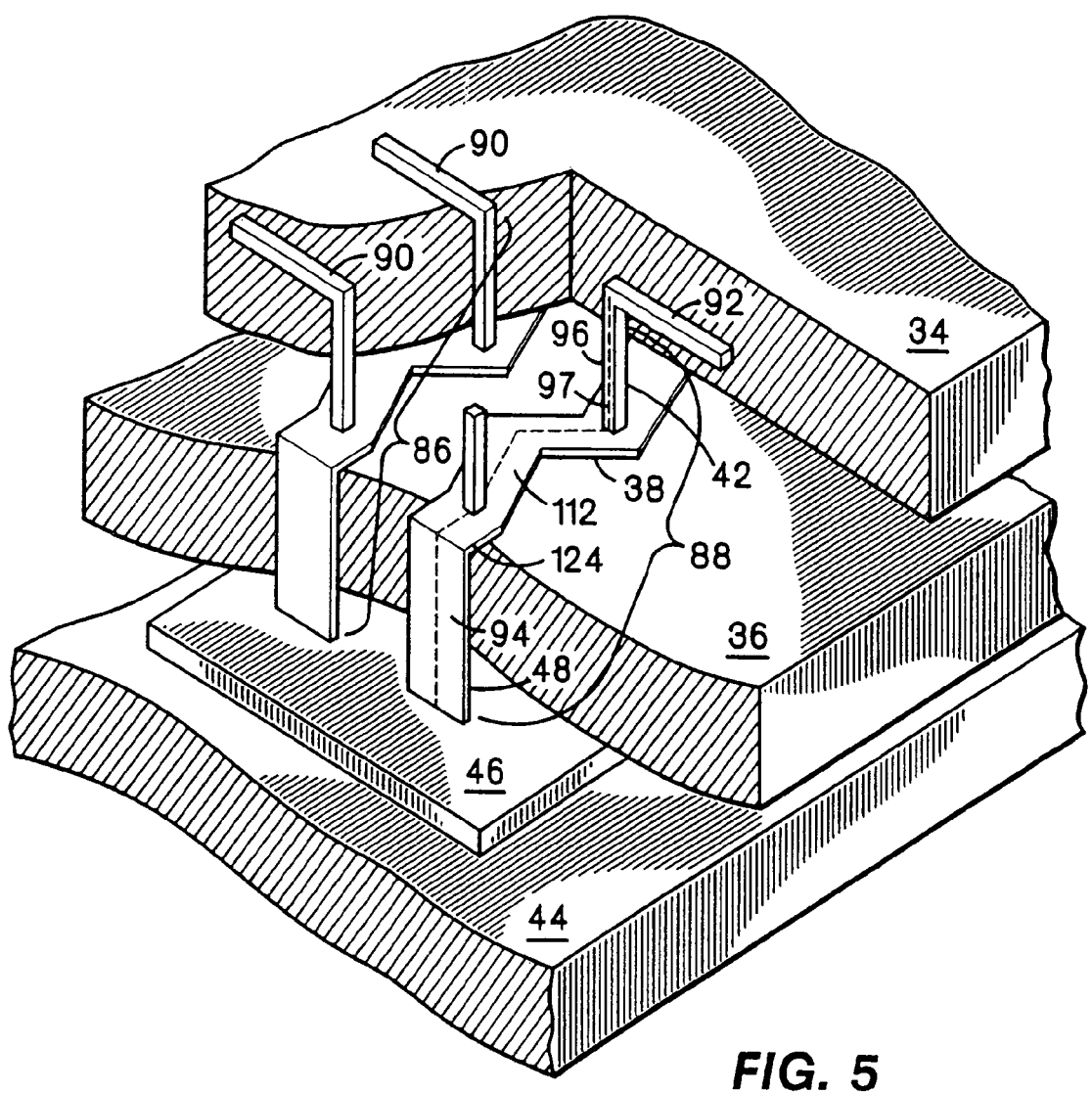
FIG. 5 is a schematic perspective view, broken away, of a portion of the screen of FIG. 1.

Referring to FIG. 5, each of the bases 86, 88 physically is made up of four segments: (1) one of the conductors 96 of link 42, (2) a portion 112 of tri-bus 38, (3) a short connecting portion 124 of tri-bus 38, and (4) one of the conductors 94 of link 48, which together define a path (e.g., the path shown as dashed line 97) with an effective length of Y from the arm (e.g., 92) to the circuit module 46.

The placement of link 42 perpendicular to the surface of layer 34 allows arms 90, 92 (formed on the surface of layer 34) to be spaced at an actual spacing Z that is closer than lambda/2, the minimum required effective Y dimension of bases 86, 88. Spacing Z may be chosen based on the bandwidth/gain tradeoff, and for example may be one quarter of the resonant wavelength for the dipole antennas of a given section (i.e., lambda/4, or 0.1125 microns (lambda$_1$/4), 0.1325 microns (lambda$_2$/4) and 0.15 microns (lambda$_3$/4) for antennas 66, 68, 70, respectively).

Figure 6:
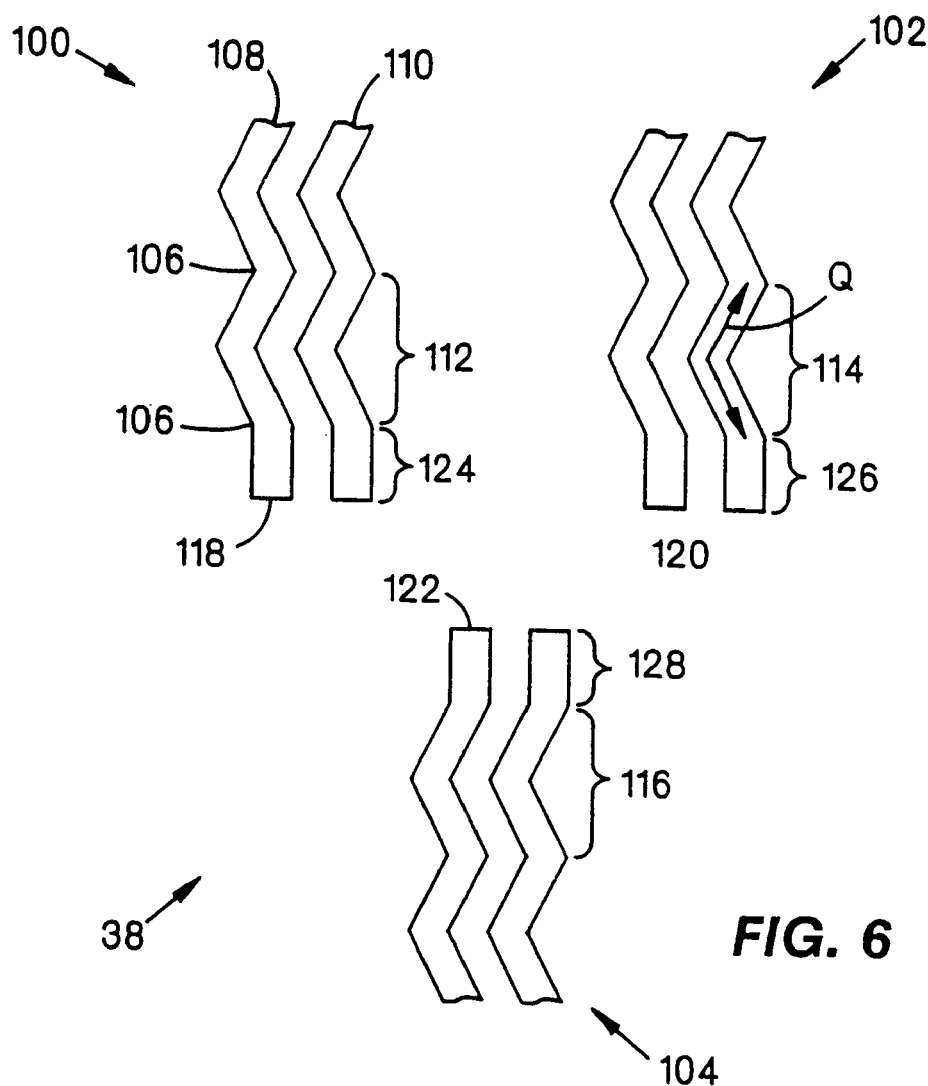
FIG. 6 is an enlarged top view of an individual tri-bus of FIG. 2.

Referring to FIG. 6, each tri-bus 38 is formed of aluminum on layer 36 and has three zigzag shaped bus pairs 100, 102, 104 for respectively connecting dipole antennas of the corresponding sections 60, 62, 64 of tri-dipole 30. Bus pairs 100, 102, 104 are connected to individual dipole antennas 66, 68, 70 via conductors of link 42 (FIG. 2) that are joined to the bus pairs at points, e.g., 106.

Each bus pair 100, 102, 104 has two parallel buses 108, 110. Bus 108 electrically connects together the arms of the dipole antenna 5 of the corresponding section and, independently, the related bus 110 electrically connects together the arms 92 of the dipole antennas of that same section.

Points 106 delineate a series of fragments 112, 114, 116 on each of the three bus pairs 100, 102, 104, respectively. Each fragment forms part of one or more of the bases 86, or 88 and therefore contributes to the effective Y dimension.

The lengths (Q) of fragments 112, 114, 116 are one-half of the resonant wavelengths (i.e. lambda/2) of the sections 60, 62, 64, or 0.225 microns (lambda$_1$/2), 0.265 microns (lambda$_2$/2), and 0.3 microns (lambda$_3$/2), respectively.

The conductors of link 48 (FIG. 2) are attached to tri-bus 38 at points 118, 120, 122 at the ends of buses 108, 110. Between points 118, 120, 122 and the first points 106 on along buses 108, 110 are fragments 124, 126, 128, which also form portions of the bases 86, 88 and are included to adjust the effective Y dimensions of those bases to be integer multiples of lambda/2. The lengths of the three fragments 124, 126, 128 are 0.1125 microns, 0.1525 microns, and 0.1875 microns, respectively.

Figure 7:
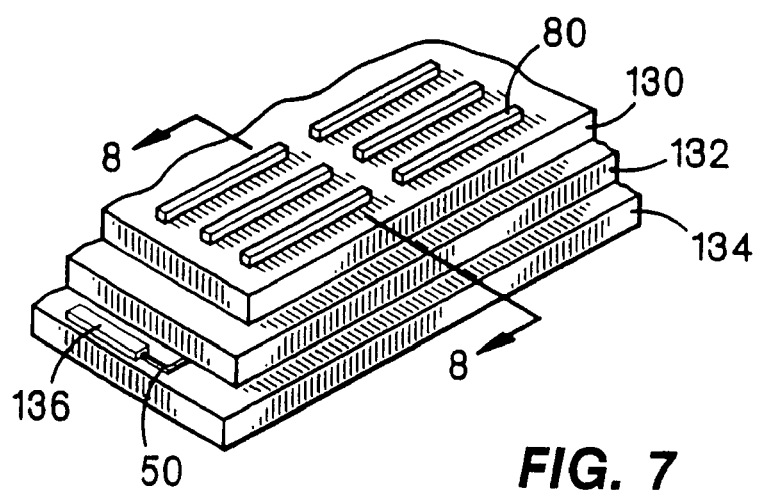
FIG. 7 is an enlarged perspective view of a representative portion of the screen of FIG. 1.

Referring to FIG. 7, each dipole antenna 80 is physically formed (of aluminum) on an insulating semiconductor (e.g. silicon dioxide of silicon nitride) substrate 130 (part of layer 34) by x-ray or electron beam lithography or other technique suitable for forming submicron-sized structures.

Tri-busses 38 (not seen in FIG. 7) are formed on the upperside of a second insulating semiconductor substrate 132 (part of layer 36). Circuit modules 46 (not seen in FIG. 7) are part of a third insulating semiconductor substrate 134 (part of layer 44) and are connected by conductors 50 to gold contact pads 136 (only one shown, not to scale) formed on the edge of substrate layer 134.

Figure 8:
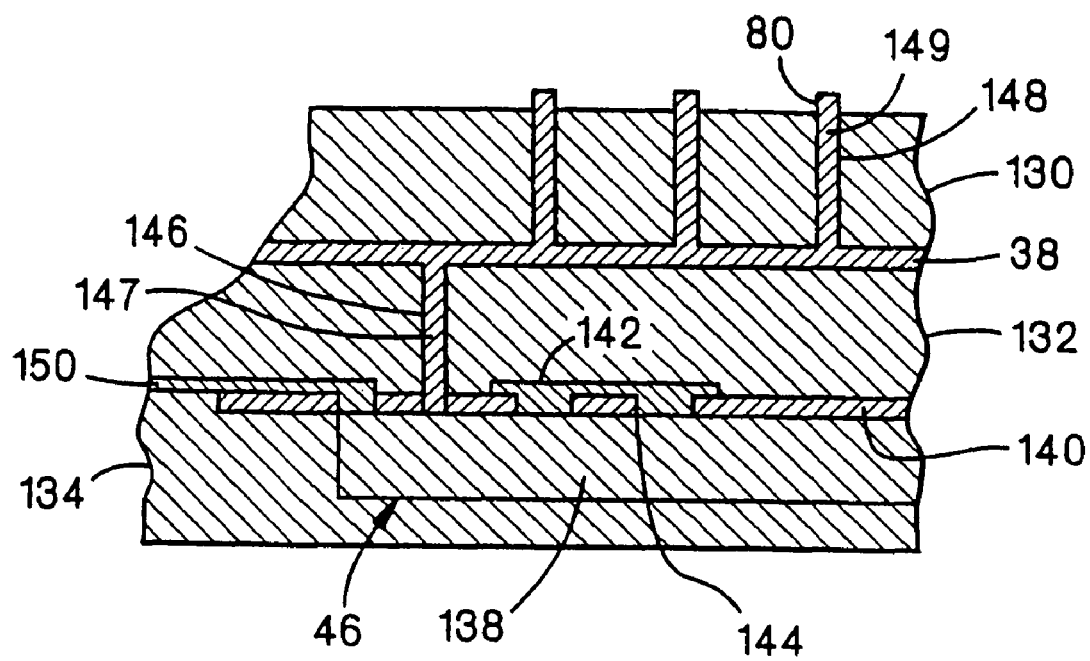
FIG. 8 is a cross-sectional view along 8-8 of FIG. 7.

Referring to FIG. 8, circuit module 46 is formed in and on substrate 134 by any one of several monolithic processes. A section 138 of the substrate 134, which has been previously coated with an insulating semiconductor oxide layer 140, is repeatedly masked (whereby small windows are opened in the oxide layer, exposing the semiconductor beneath) and exposed to n and p dopants to form the desired circuit elements (not shown in detail in FIG. 8).

The individual circuit elements are connected to each other and to external contact pad 136 (FIG. 7) by aluminum conductors 142, 50, respectively. To form the connections, holes 144 are opened in oxide layer 140 and a sheet of aluminum is deposited, filling holes 144. Using a masking technique similar to the one described above the unwanted aluminum is removed, leaving only conductors 142, 50.

Semiconductor substrate layer 132 is deposited directly on top of the remaining exposed oxide layer 140 and conductors 142, 50. Holes 146 (one shown) (opened using a suitable lithographic technique) are channels for the electrical conductors 147 of links 48, which connect tri-bus 38 and circuit module 46. Tri-bus 38 is etched from a sheet of aluminum deposited onto the surface of layer 132. The deposition process fills holes 146, thereby forming the conductors of links 48.

Substrate layer 130 is deposited onto the surface of substrate layer 132 and tri-bus 38. The arms of dipole antennas 80 are formed by depositing a sheet of aluminum onto the surface of layer 130 and etching away the unwanted metal. During the deposition process holes 148 are filled thereby forming the conductors 149 of links 42 between the arms of dipole antenna 80 and tri-bus 38.

The conductors 149 are the uppermost parts of bases 86, 88 (FIG. 4) of dipole antennas 66, 68, 70; the lengths of conductors 149 together with the lengths of fragments 112, 114, 116 (FIG. 6), the lengths of fragments 124, 126, 128, and the lengths of the conductors 147 determine the effective Y dimension of bases 86, 88.

The length of the conductors 149 is determined by the thickness of the substrate 130 through which links 42 pass. Substrate 130 and links 42 are 0.05625 microns (i.e. lambda$_1$/8) thick. This thickness is achieved by controlling the deposition rate of the semiconductor material as layer 130 is formed.

The length of the conductors 149 is determined by the thickness of the substrate layer 132 through which they pass. This, layer and links 48 are therefore also 0.05625 microns 20 thick.

The Y dimensions for the dipole antennas 66, 68, 70 of sections 60, 62, 64 therefore are as follows:

(a) For section 60, Y equals the sum of 0.05625 microns (length of the conductor in link 42, lambda$_1$/8)+n*0.225 microns (where 0.225 microns=lambda$_2$/2, the length of a fragment 112, and n=the number of fragments 112 in each base 86, 88 of the nth dipole antenna 66n)+0.1125 microns (length of fragment 124, lambda$_1$/4)+0.05625 microns (length of the conductor in link 48, lambda$_1$/8), and that sum equals (n+1)*(lambda$_{1/2}$).

(b) For section 62, Y equals the sum of 0.05625 microns (length of link 42, lambda$_1$/8)+n*0.265 microns (where 0.265 microns=lambda$_2$/2, the length of a fragment 114, and n=the number of fragments 114 in each base 86, 88 of the nth dipole antenna 68n)+0.1125 microns (length of fragment 126, (lambda$_2$/2)−(lambda$_1$/4))+0.05625 microns (length of the conductor in link 48, lambda$_1$/8), and that sum equals (n+1)*(lambda$_1$/2).

(c) For section 64, Y equals the sum of 0.05625 microns (length of conductor in link 42, lambda$_1$/8)+n*0.3 microns (where 0.3 microns=lambda$_3$/2, the length of a fragment 116, and n equals the number of fragments 116 in each base 86, 88 of the nth dipole antenna 70n)+0.1875 microns (the length of fragment 128, (lambda$_3$/2)−(lambda$_1$/4))+0.05625 microns (length of conductor in link 48), and that sum equals (n+1)*(lambda$_3$/2).

Referring again to FIG. 1, in some embodiments, the displayed image is not emitted from device 20 but is comprised of ambient light (or light from a source, not 25 shown) selectively reflected by the tri-dipoles 30 of screen 22.

In that case, each tri-dipole 30 receives ambient light having a broad spectrum of wavelengths and is controlled by the corresponding circuit module to reflect only that portion of the ambient light manifesting the hue and brightness of the desired corresponding pixel.

The hue generated by tri-dipole 30 depends on the relative intensities of the light reflected by sections 60, 62, 64. The overall brightness of that hue of light in turn depends on the absolute intensities of the light radiation reflected by sections 60, 62, 64. Thus, both the hue and brightness of the light generated by tri-dipole 30 can be controlled by regulating the intensity of the light reflected by the dipole antennas in each section of the tri-dipole; this is done by controlling the reflectivity of each dipole antenna, i.e. the percentage of the light of the relevant wavelength for that dipole antenna which is reflected.

The desired percentage is attained not by regulating the amount of light reflected at any given instant but by arranging for the antenna to be fully reflective in each of a series of spaced apart time slots, and otherwise non-reflective. Each dipole antenna, in conjunction with its circuit module, has only two possible states: either it reflects all of the light (at the antenna's resonant frequency), or it reflects none of that light. The intensity is regulated by controlling the percentage of total time occupied by the time slots in which the dipole antenna occupies the first state.

Each dipole antenna is controlled to be reflective or not by controlling the impedance of the dipole antenna relative to the impedance of the medium (e.g., air) through which the light travels. If the medium has an effective impedance of zero, then the relationship of the reflectivity of the dipole antenna to zero (the controlled impedance of the dipole antenna) can be derived as follows. If we define a three-axis system x-y-z in which the x and y axes are in the plane of the array and the z axis is the axis of propagation of the incident and reflected waves, where z=0 is the surface of the array, then the incident plus reflected wave for z<0 may be represented as:

$$\bar{E} = \hat{x} E_0 e^{-jkz} + \hat{x} E_r e^{+jkz} \qquad (1)$$

$$\bar{H} = \frac{\nabla \times \bar{E}}{-j\omega\mu_0} = \hat{y} \frac{1}{\eta_0} [E_0 e^{-jkz} - E_r e^{+jkz}] \qquad (2)$$

where E (overbar) is the complex amplitude of the electric field of the sum of the transmitted wave and the reflected wave; $E_0$ is the complex amplitude of the electric field of the transmitted 20 wave; $E_r$, is the complex amplitude of the electric field of the reflective wave; x(hat) is the orientation of the electric field of the wave; H is the amplitude of the magnetic field; y(hat) is the orientation of the magnetic field; $\mu_0$ is the permeability of free space; $\in_o$ is the permittivity of free space; k=$\omega$sqrt[$\mu_0 \in_0$] is the wavenumber; and $\eta$=sqrt [$\mu_0/\in_0$] is the impedance of free space. For z>0 (i.e., within free space) only the transmitted wave exists and is represented by $$\bar{E} = \hat{x} E_t e^{-jk_t z} \quad (3)$$

$$\bar{H} = \hat{y} \frac{1}{\eta_t} E_t e^{-jk_t z} \quad (4)$$

E(overbar) is the complex amplitude the transmitted wave at $\bar{z}$=0, $k_t$=sqrt [$\mu\epsilon$] is its wavenumber; $\eta$=sqrt [$\mu/\in$] is the impedance of the medium, i.e. z>0. Boundary conditions (z=0) for tangential electric fields are imposed on equations 1 and 2 and they are combined to yield, $$\hat{x}[\underline{E}_0 + \underline{E}_x] = \hat{x}\underline{E}_t \quad (5)$$

In the same way, continuity for tangential magnetic fields (z=0) at the boundary yields, $$\hat{y}(1/\eta_0)(\underline{E}_0 - \underline{E}_R) = \hat{y}(1/\eta_t)\underline{E}_t \quad (6)$$

Dividing equations 5 and 6 by $\underline{E}_0$, and $\underline{E}_0/\eta_0$ respectively gives the following two equations:

$$1 + \underline{E}_x/\underline{E}_0 = \underline{E}_t/\underline{E}_0 \quad (7)$$

$$1 - \underline{E}_R/\underline{E}_0 = (\theta_0/\eta_t)(\underline{E}_t/\underline{E}_0) \quad (8)$$

$E_x/E_0$ is called $\Gamma$ and is the complex reflection coefficient while $E_t/\eta_0$=T is called the complex transmission coefficient, and $\eta_t/\eta_0$=$\eta_n$ is the normalized wave impedance. Solving for T and $\Gamma$ yields $$T = \frac{E_t}{E_0} = \frac{2}{1 + \eta_0/\eta_t} = \frac{2\eta_n}{\eta_n + 1} \quad (9)$$

$$\Gamma = \frac{E_R}{E_0} = T - 1 = \frac{\eta_N - 1}{\eta_n + 1} \quad (10)$$

For matched impedance values, $\eta_0 = \eta_n$, the reflection coefficient is zero, and T=1 (i.e., no reflection), and in the case of a load at the boundary, a matched antenna, there is complete absorption.

As $\eta_n$ approaches zero or infinity, the reflection coefficient approaches plus or minus one, implying total reflection.

Figure 9:
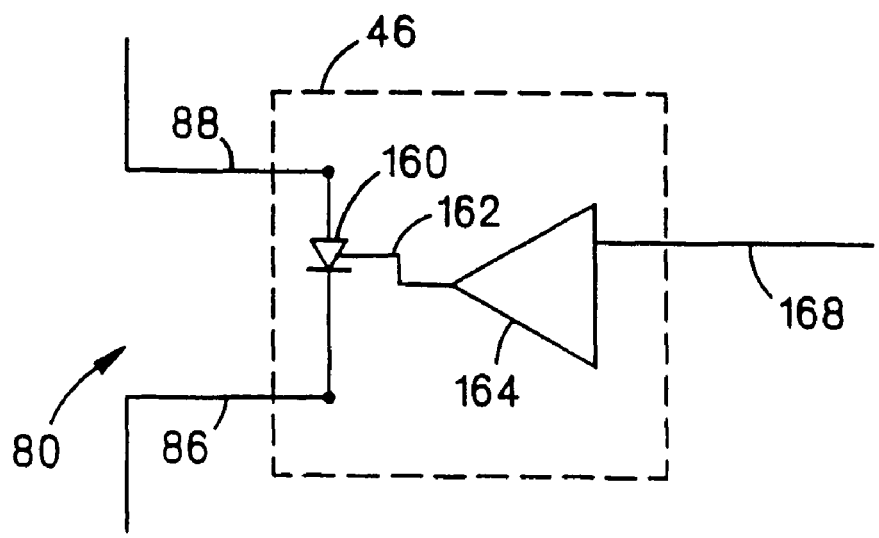
FIG. 9 is a diagram of a portion of a control circuit of FIG. 2, and a corresponding dipole antenna of FIG. 3.

Referring to FIG. 9, the impedance $z_L$, of dipole antenna 80 is controlled by a variable resistance PIN diode 160 connected across bases 86, 88. PIN line 162 to the output of a bias high voltage or a low voltage based on a line 168 from power and the output of bias source 164 is a high voltage, the resistance R of PIN diode 160 (and hence the impedance (E,) of the dipole antenna is zero causing full reflection; when the output of bias source 164 is a low voltage 98, resistance R is set to a value such that the resulting impedance z@ is matched to z. (the impedance of the air surrounding the antenna), causing zero reflection.

To generate an entire image on screen 20, power and control circuitry 26 receives a video signal (e.g. a digitized standard RGB television signal) and uses conventional techniques to deliver corresponding signals to modules 46 which indicate the relative desired intensities of light reflected from all sections 60, 62, 64 of all of the tri-dipoles in the array at a given time. Circuit modules 46 use conventional techniques to deliver an appropriate stream of input control signal pulses to each bias source 164 on line 168.

Figure 10A:
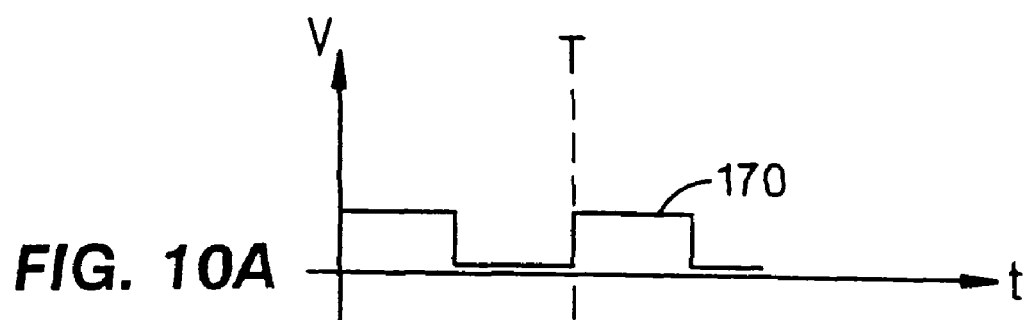
FIGS. 10A, 10B, 10C are representative graphs of the input voltage to the bias source of FIG. 9.
Figure 10B:
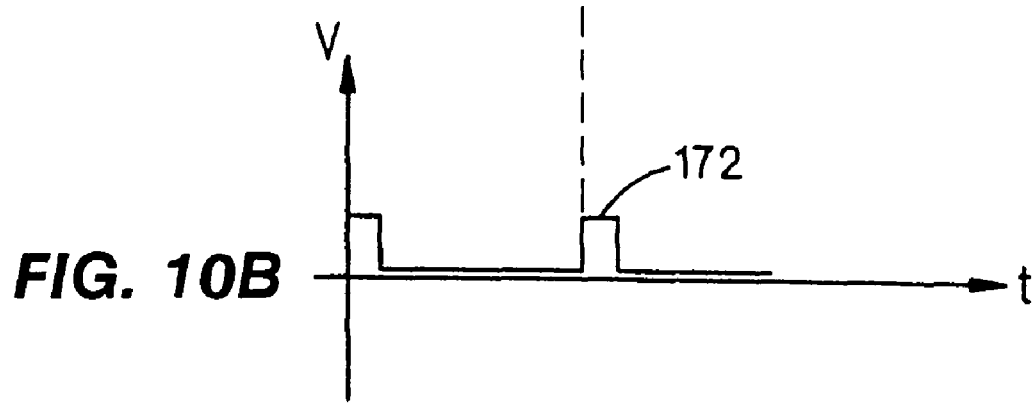
Figure 10C:
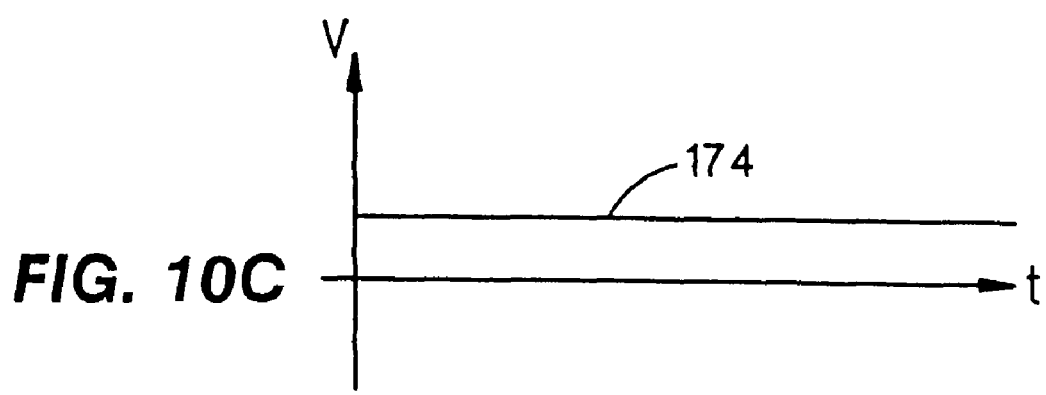

The pulse stream on each line 168 has a duty cycle appropriate to achieve the proper percentages of reflectance for the three Sections of each tri-dipole. Referring to FIGS. 10A, 10B, and 10C, for example, pulse stream 170 has a period T and a 50% duty cycle. For the first 50% of each period T the input to bias source 164 is high and the Corresponding output of source 164 is a high voltage. During this portion of the cycle dipole antenna 80 will reflect all received light having the dipole antenna's resonant wavelength. For the second 50% of the cycle the output of source 164 will be low and dipole antennas 80 will absorb the received light. In FIGS. 10B, 10C, pulse streams 172, 174 represent a 30% duty cycle and a 100% duty cycle respectively; with a 30% duty cycle the effective intensity of the light radiation of the dipole antennas of the section will be 30%; for a duty cycle of 100%, the effective intensity is 100%.

For example, if a particular pixel of the image is to be brown, the relative intensities required of the three red, green, and blue sections 60, 62, 64 may be, respectively, 30, 40, and 10. The input signals to the bias sources 164, carried on lines 168, would then have duty cycles, respectively, of 30%, 40%, and 10%. An adjacent pixel which is to be a brown of the same hue but greater brightness might require duty cycles of 45%, 60%, and 15%.

Figure 11:
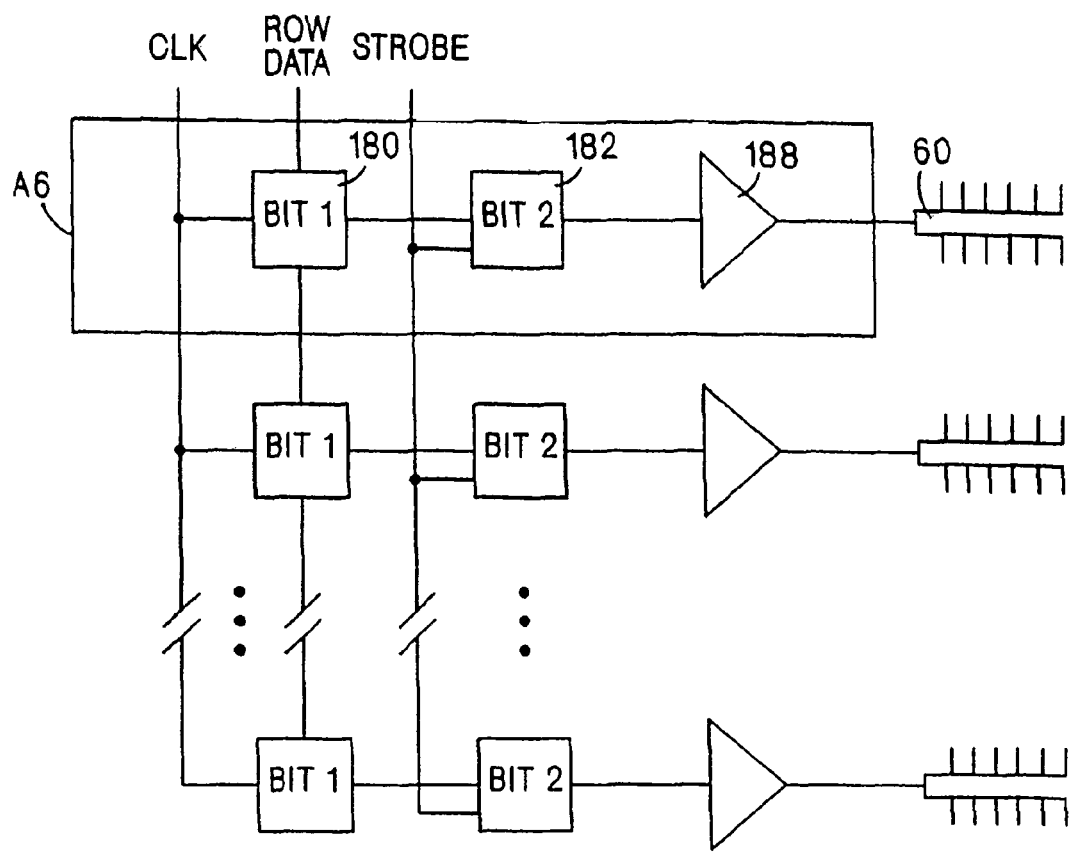
FIG. 11 is a diagram of portions of the control modules for a row of pixels.

Referring to FIG. 11, to accomplish the delivery of the pulse width modulated signals from circuitry 26 to the pixel circuit modules 46, each circuit module 46 in the row includes storage 180, 182 for two bits. The bit 1 storage elements 180 of the modules 46 in the row are connected together to create one long shift register with the pulse width modulated signals being passed along the row data line 184 from pixel to pixel. If, for example, the period of the modulated signals is 1 millisecond and there are ten different intensity levels, then an entire string of bits (representing the on or off state of the respective pixels in the row during the succeeding 1/10 millisecond) is shifted down the row every 1/10 millisecond. At the end of the initial 1/10 millisecond all of the bits in elements 180 are shifted to the associated elements 182 by a strobe Pulse on strobe line 186. The content of each element 182 is the input to the driver 188 for the appropriate one of the three colors of that pixel, which in turn drives the corresponding section 60, 62, 64 of the tri-dipole. The rate at which data is shifted along the shift registers is determined by the number of elements on a given row, the number of rows, the number of intensity levels, and the refresh rate of the entire array.

In another embodiment, the light comprising the image is emitted by tri-dipoles 30 rather than being produced by reflected ambient light. In that case, each tri-dipole generates the light for a single pixel with a hue and brightness governed by the intensities of the light emitted by each of the three sections 60, 62, 64.

Each dipole antenna within a tri-dipole is caused to emit light at the resonant wavelength of that antenna by stimulating it using a signal whose frequency corresponds to the resonant wavelength. Thus, the sections 60, 62, 64 will emit blue (lambda$_1$), green (lambda$_2$), and red (lambda$_3$) light respectively when provided with signals whose frequencies equal, respectively, lambda$_1$, lambda$_2$ and lambda$_3$.

For an idealized dipole, the current I and current density J(overbar) (r'overbar) are described by $$\underline{I} = j\omega \underline{g} \quad (11)$$

$$\underline{J}(\bar{r}') = \hat{z} I d \delta(\bar{r}') \quad (12)$$

where q is the charge density; z(hat) indicates the direction of the current (along the z-axis); ω is angular frequency; and d is the distance between ideal point charges representing the dipole. The vector potential $\bar{A}$(overbar) in polar coordinates is given by $$\bar{A} = \hat{r}A_r + \hat{\theta}A_\theta = (\hat{r}\cos\theta - \hat{\theta}\sin\theta)\frac{\mu_0 Id}{4\pi r}e^{-jkr} \quad (13)$$

where θ represents the angle relative to the dipole; θ(hat) is the angular orientation of the wave; $\mu_0$ is the permeability of free space; r is radius from the dipole; r(hat) is radial orientation of the wave; $A_r$ is the radial component of the vector potential; $A_\theta$ is the angular component of the vector potential; and k is a factor which is used to represent sinusoidally varying waves. The H field is given by
where φ is elevation, with respect to the dipole. The E field is given by,
The far-field equation is given by $$\bar{H} = \varphi\frac{1}{\mu_0 r}\left[\frac{\delta}{\delta\theta}(rA_\theta) - \frac{\delta}{\delta\theta}(A_r)\right] \quad (14)$$

$$= \varphi\frac{jkId}{4\pi r}e^{-jkr}\left[1 + \frac{1}{jkr}\right]\sin\theta$$

$$\bar{E} = \frac{1}{j\omega\epsilon_0}\nabla \times \bar{H} \quad (15)$$

$$= \sqrt{\mu_0/\epsilon_0}\frac{jkId}{4\pi r}e^{jkr}\left(\hat{r}\left[\frac{1}{jkr} + \left(\frac{1}{jkr}\right)^2\right]2\cos\theta + \hat{\theta}\left[1 + \frac{1}{jkr} + \left(\frac{1}{jkr}\right)^2\right]\sin\theta\right)$$

$$\bar{H} = \hat{\varphi}\frac{jkId}{4\pi r}e^{-jkr}\sin\theta \quad (16)$$

$$\bar{E} = \hat{\theta}\sqrt{\mu_0/\epsilon_0}\frac{jkId}{4\pi r}e^{-jkr}\sin\theta$$

Equation (16) describes the radiation pattern away from a dipole antenna at distances significantly greater than the wavelength of the emitted electromagnetic wave. It is a very broad radiation pattern providing a wide field of view at relevant distances.

Figure 12:
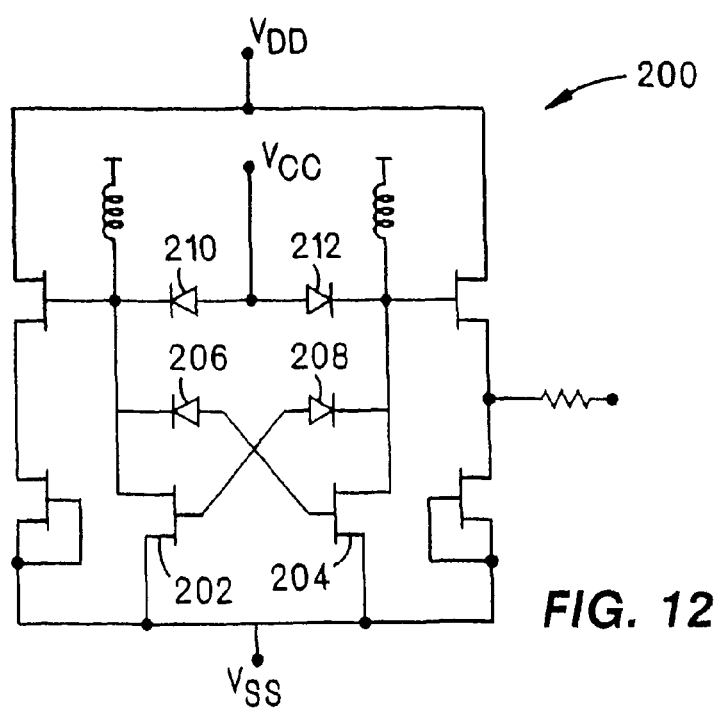
FIG. 12 is a circuit diagram of an oscillator.

Referring to FIG. 12, the dipole antennas 66, 68, 70 of each section 60, 62, 64 are driven by signals (e.g., sinusoidal) with frequencies of $5\times10^{14}$ Hz, $5.6\times10^{14}$ Hz, and $6.6\times10^{14}$ Hz for red, green, and blue, respectively. These signals are supplied by three monolithic oscillators 200 (one shown) within circuit module 46, each tuned to one of the three required frequencies.

In circuit 200 (an a stable multivibrator), the center pair of coupled transistors 202, 204 are the primary active elements and will oscillate if the circuit admittance's are set appropriately. Diodes 206, 208, 210, 212 provide coupling capacitance's between the transistors and the inductors 214, 216 are used to tune the operating frequency.

In a third embodiment, an image of the object is focused by a conventional lens (not shown in FIG. 1) onto screen 22, which then acts as an image sensor. The tri-dipoles of screen 22, controlled by power and control circuitry 26, generate electrical signals corresponding to pixels of the received image. The signals are then processed by a processor which, in conventional fashion, delivers a derived RGB video signal which can then be transmitted or stored.

The signals generated for each tri-dipole are generated by the corresponding circuit module 46 and represent the hue and brightness of the light radiation received at that tri-dipole.

Each section of tri-dipole 30 can only be used to measure light having the resonant wavelength of its respective dipole antennas, however, because most colors can be expressed as a combination of red, green, and blue, circuit module 46 can, by independently measuring the intensity of the light radiation received at each section 60, 62, 64, derive a signal which specifies the hue and intensity of the received pixel.

Figure 13:
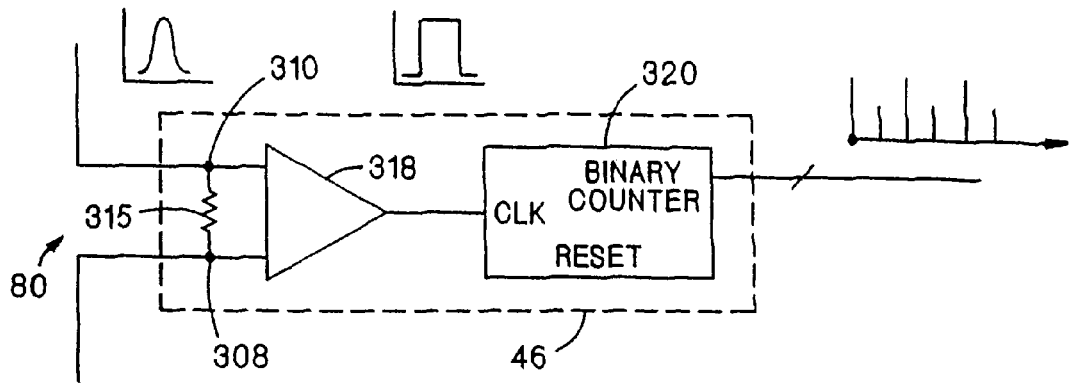
FIG. 13 is a schematic diagram of a circuit module of FIG. 2, a corresponding dipole antenna of FIG. 3, and a graphical representation of the output of a binary counter.

Referring to FIG. 13, dipole antenna 80 will absorb incident light radiation at its resonant wavelength when its reflection coefficient ($\Gamma_L$) is zero, which occurs when its controlled impedance ($z_L$) matches the impedance of the medium ($z_0$). In those circumstances, a voltage pulse is produced across the ends 308, 310 of dipole 80 for each incident photon. The relative magnitude of the light radiation received by each dipole antenna can thus be measured by counting the average number of pulses across ends 308, 310 over a given time period.

In this embodiment, circuit module 46 includes a terminating load resistor 315 connected across ends 308, 310. The controlled impedance of the combination of dipole antenna 80 and resistor 315, described by the equations set forth below, is equal to $z_0$.

The voltage of the pulse across resistor 315 (created by an incident photon) is illustrated by the sine wave graph above register 15 and is described generally by the following equation $$V(z)=V+e^{-jkz}+\Gamma_L e^{jkz} \quad (17)$$

Because $z_L=z_0$, $\Gamma_L=0$, and equation 17 simplifies to $$V(z)=V+e^{-jkz} \quad (18)$$

A pulse detector 318 amplifies and sharpens the resulting pulse to a square wave form as shown, which is then used as the clock (CLK) input 319 to a binary counter 320. The output of the binary counter is sampled at a regular rate; collectively the samples form a digital signal representing the intensity of received light radiation over time. Each time counter 320 is sampled, it is reset to zero by a pulse on control line 322, Counter 320 thus serves as a digital integrator that indicates how much light arrived in each one of a succession of equal length time periods.

Figure 14:
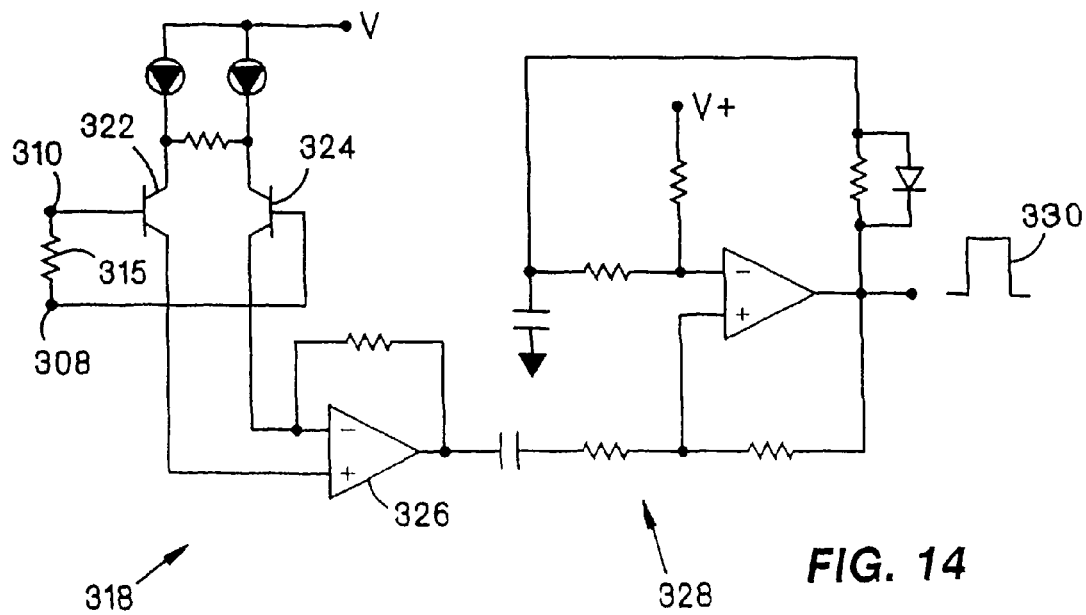
FIG. 14 is a circuit diagram of the pulse counter of FIG. 13.
Figure 15:
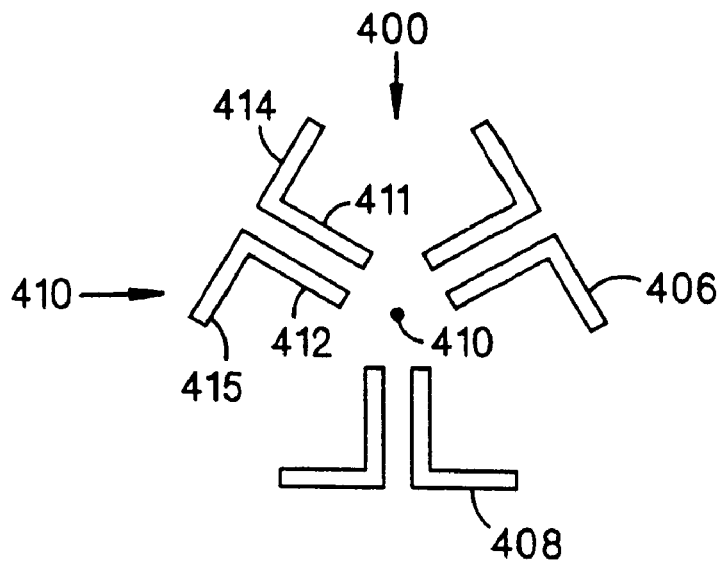

Referring to FIG. 14, in pulse detector 318 the pair of transistors 322, 324 serve as a high impedance differential stage whose output (representing the voltage difference between points 308, 310) is delivered to an amplifier 326. Amplifier 326 serves as a high-bandwidth gain stage and delivers a single sided output pulse to a conditioning circuit 328 that converts slow rising pulses to square pulses 330 for driving counter 320.

In another embodiment, the array of tri-dipoles is operated as a phased array. The operation of phased arrays is discussed more fully in Amitay, et al., *Theory and Analysis of Phased Array Antennas*, 1972, incorporated herein by reference. By controlling the spacing of successive tri-dipoles across the array and the relative phases of their operation, wave cancellation or reinforcement can be used to control the direction in three dimensions and orientation of the radiation. Beams can thus be generated or scanned. In the case of an array used to sense incoming radiation, the array can be made more sensitive to radiation received from selected directions.

Other embodiments are also possible. For example, referring to FIG. 15, each section of tri-dipole 400 array be a single dipole antenna 406, 407, 408. The tri-dipole antennas are then arranged about a center Point 410 at 120 degree intervals in a radial pattern. Bases 411, 412, as well as arms 414, 415, of the dipole antennas, are all formed on the same surface.

Figure 16:
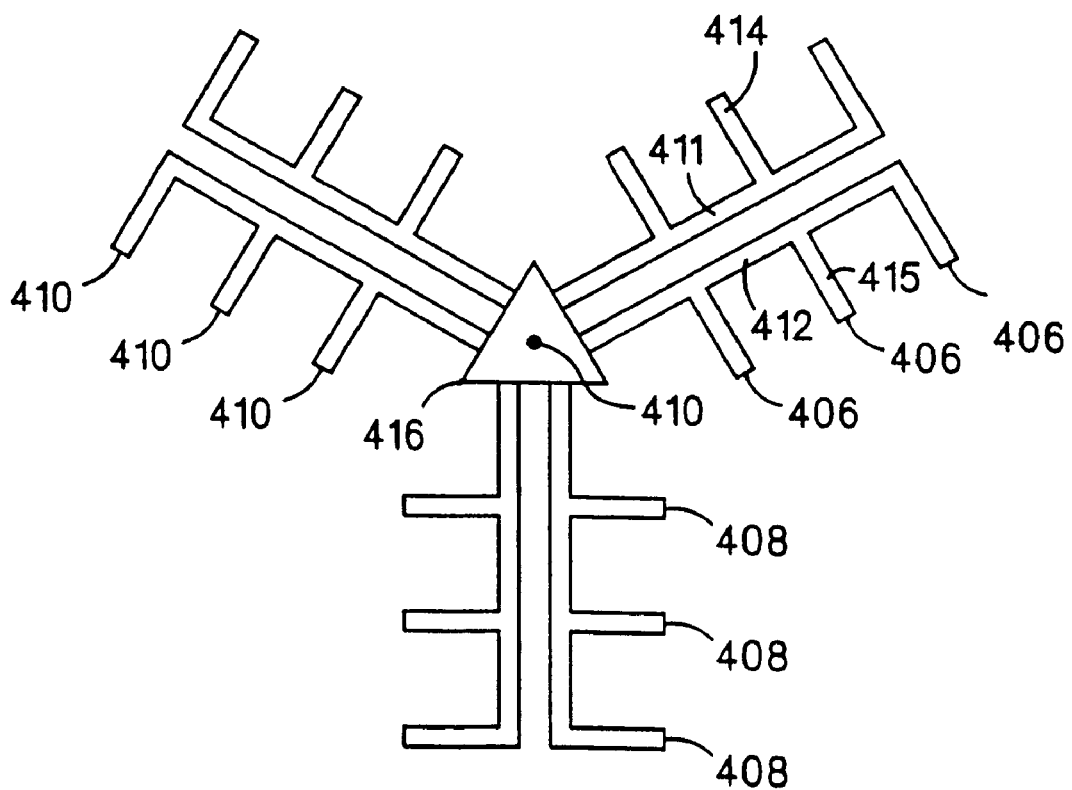

Referring to FIG. 16, each section may consist of multiple dipole antennas 406, 407, 408 connected by attaching the bases 411, 412 of each succeeding dipole antenna to the inner ends of arms 414, 415 of the preceding dipole antenna. Circuit modules 416 are formed on the surface of layer 413.

Figure 17:
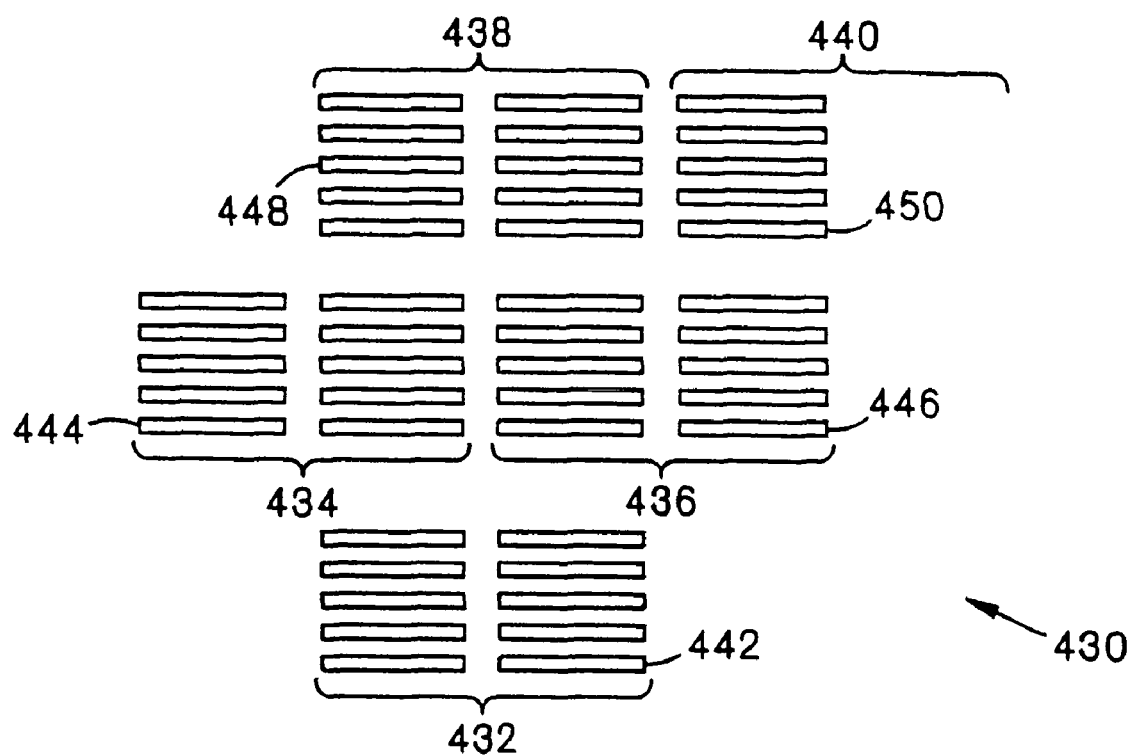

Referring to FIG. 17, a multi-dipole 430 could have five sections 432, 434, 436, 438, 440 composed of dipole antennas 442, 444, 446, 448, 450, respectively. The dipole antennas of the different sections would have different resonant wavelengths. Other multi-dipoles might have any number of sections.

The scanning of pixels could be done other than by pulse width modulation, for example, using charge coupled devices to shift packets of charge along the rows of pixels.

Figure 18:
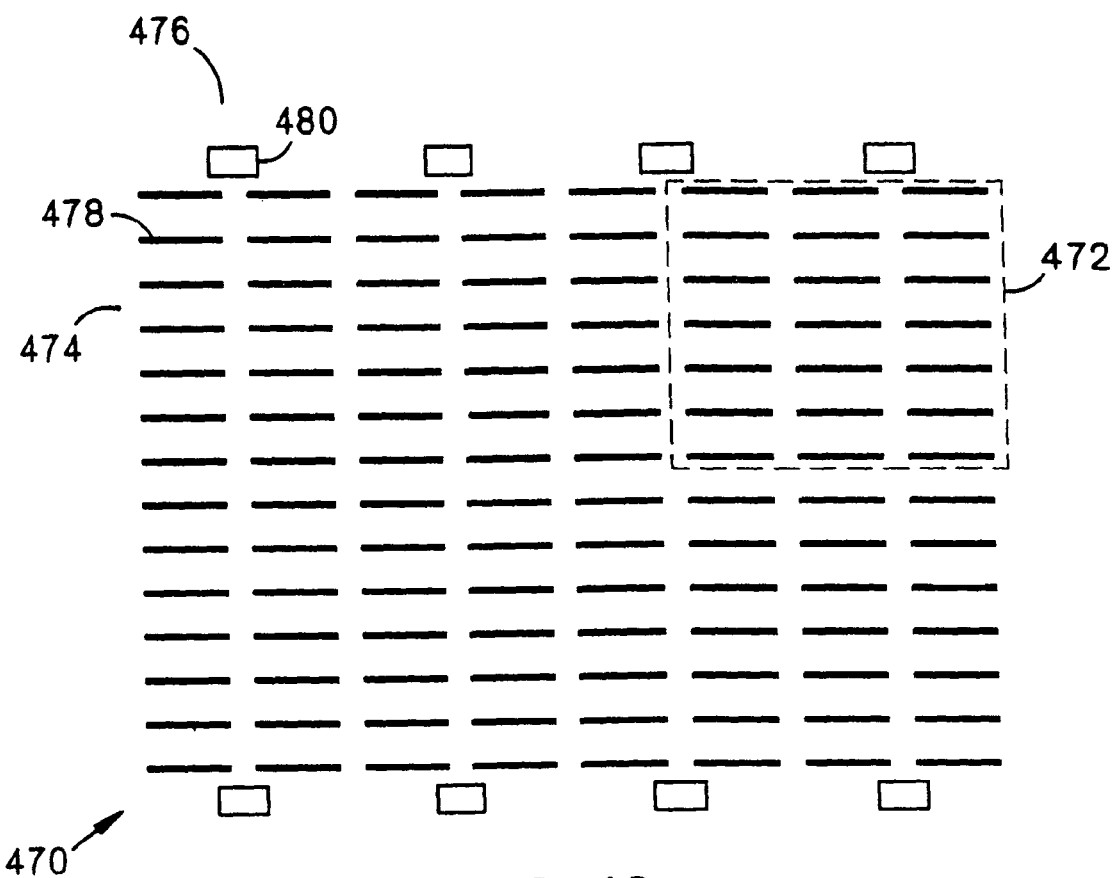
Figure 19:
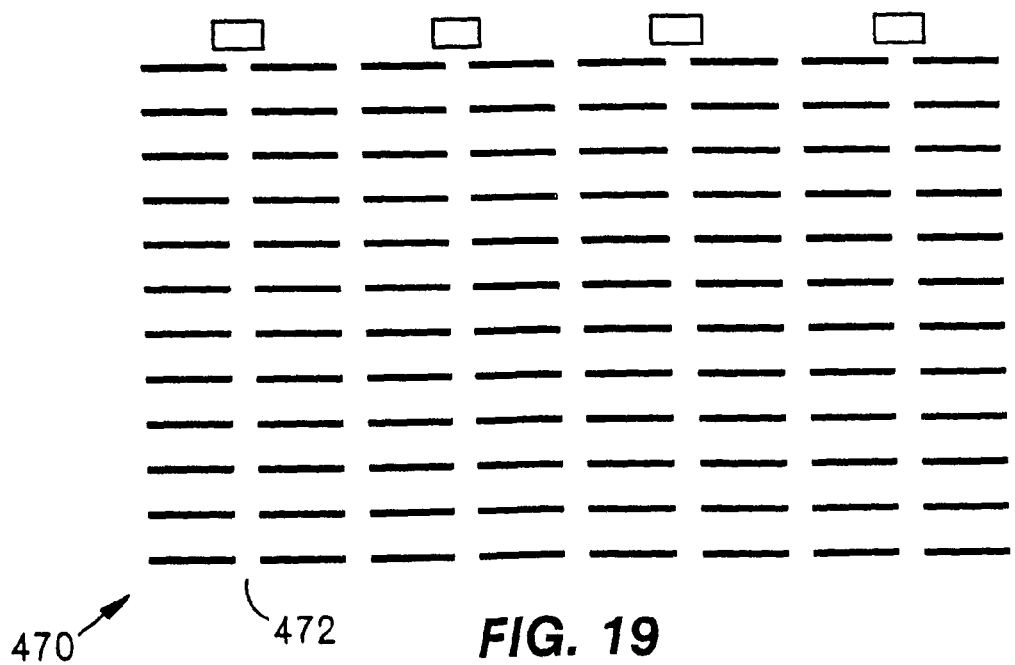

Referring to FIGS. 18, 19, other arrangements of dipole antennas may be used in order to match the area required for the control circuit modules.

Referring to FIG. 18, each section 470 of a tri-dipole in the reflective mode could be formed of a number of subsections (e.g., 472) arranged in two rows 474 and a number of columns 47. The antennas 478 in each subsection 472 are all served by a single PIN diode circuit 480 located at the peripheral edge of section 470 at the end of the subsection on the layer below the antenna layer. All circuits 480 for the entire Section 470 are in turn served by a single bias source 164 (FIG. 9). This arrangement reduces the number of bias sources required for the entire array of tri-dipoles. FIG. 19 shows an alternate arrangement in which there is but one row of subsections each served by a single PIN diode circuit at the end of the row.

In order to reduce the number of conductors 50, selected tri-dipoles could be used to receive control signals transmitted directly by light and to pass those control signals to the control circuits of nearby active tri-dipoles.

The dipoles could be mono-dipoles comprised of only a single dipole antenna, all with the same resonant wavelength.

Dipole antennas 470 could be randomly arranged on the surface of layer 472 of screen 22.

A different color regime, e.g. cyan-magenta-yellow, could be substituted for RGB.

Spiral, biconical, slotted, and other antenna configurations could be substituted for the dipole configuration.

The array could be three-dimensional.

The successive tri-dipoles in the array can be oriented so that their respective antennas are orthogonal to each other to enable the array to interact with radiation of any arbitrary polarization.

The PIN diodes could be replaced by other impedance controlling elements. Such elements might include quantum well transistors, superconducting junctions, or transistors based on vacuum microelectronics. Further improvement could be achieved by reducing the complexity of the third layer containing control circuitry. The electronics required to get control signals to the circuitry could be eliminated by the use of laser or electron beams to provide such signals. This would have the advantage of allowing for arrays of even higher density.

The array could be fabricated on a transparent substrate, thus facilitating transmissive operation.

In other embodiments, the antenna arrays alone (without control circuitry or connection buses) may be fabricated on one-half of a microfabricated interferometric cavity. The antenna array can be considered a frequency selective mirror whose spectral characteristics are controlled by the dimensions of the antennas. Such a cavity will transmit and reflect certain portions of incident electromagnetic radiation depending on (a) the dimensions of the cavity itself and (b) the frequency response of the mirrors. The behavior of interferometric cavities and dielectric mirrors is discussed more fully in Macleod, H. A., *Thin Film Optical Filters,* 1969, incorporated by reference.

Figure 20A:
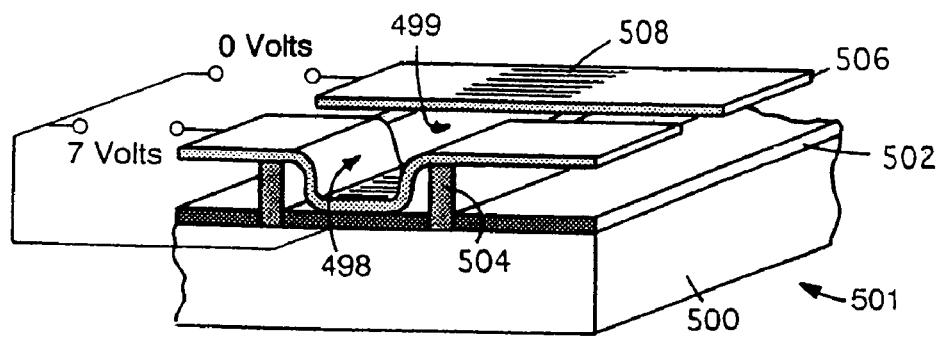

Referring to FIG. 20*a*, two example adjacent elements of a larger array of this kind include two cavities 498, 499 fabricated on a transparent substrate 500. A layer 502, the primary mirror/conductor, is comprised of a transparent conductive coating upon which a dielectric or metallic mirror has been fabricated. Insulating supports 504 hold up a second transparent conducting membrane 506. Each array element has an antenna array 508 formed on the membrane 506. The two structures, 506 and 508, together comprise the secondary mirror/conductor. Conversely, the antenna array may be fabricated as part of the primary mirror/conductor. Secondary mirror/conductor 506/508 forms a flexible membrane, fabricated such that it is under tensile stress and thus parallel to the substrate, in the undriven state.

Because layers 506 and 502 are parallel, radiation which enters any of the cavities from above or below the array can undergo multiple reflections within the cavity, resulting in optical interference. Depending on the dimensions of the antenna array, as explained above, the interference will determine its effective impedance, and thus its reflective and/or transmissive characteristics. Changing one of the dimensions, in this case the cavity height (i.e., the spacing between the inner walls of layers 502, 506), will alter the optical characteristics. The change in height is achieved by applying a voltage across the two layers at the cavity, which, due to electrostatic forces, causes layer 506 to collapse. Cavity 498 is shown collapsed (7 volts applied), while cavity 499 is shown uncollapsed (0 volts applied).

Figure 20B:
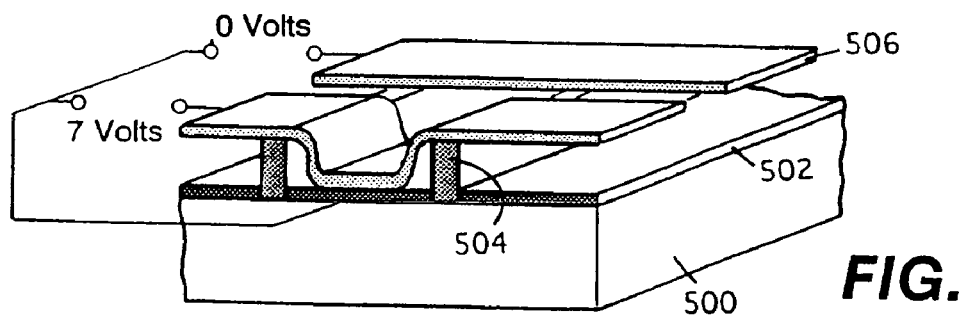

In another embodiment, FIG. 20*b*, each cavity may be formed by a combination of dielectric or metallic mirrors on the two layers, and without the antennas formed on either layer. In this case the spectral characteristics of the mirror are determined by the nature and thickness(es) of the materials comprising it.

Figure 20C:
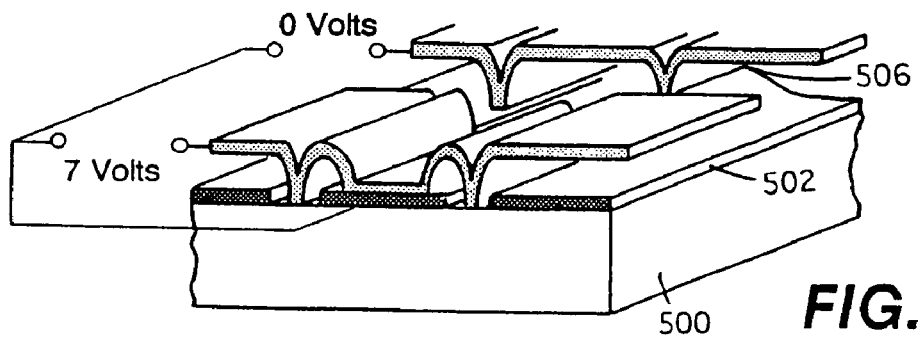

In an alternative fabrication scheme, FIG. 20*c*, each cavity is fabricated using a simpler process which precludes the need for separately defined support pillars. Here, each secondary mirror/conductor, 506, is formed in a U-shape with the legs attached to the primary layer; each secondary mirror/conductor thus is self-supporting.

Figure 20D:
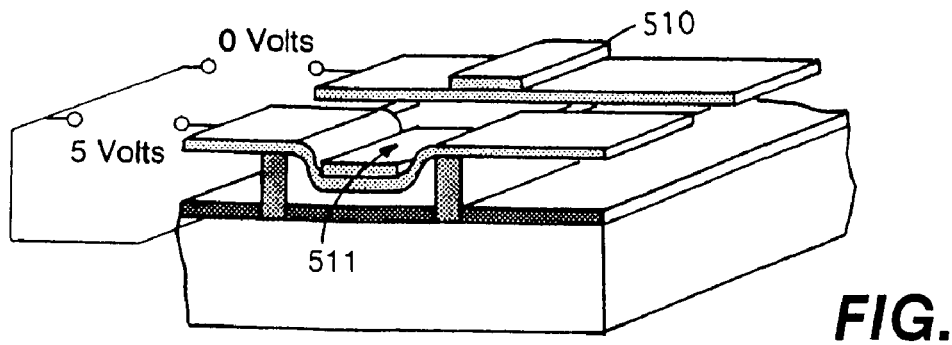

In yet another scheme, FIG. 20*d*, the cavity has been modified to alter its mechanical behavior. In this version, a stiffening layer, 510, has been added to limit deformation of the membrane while in the driven state. This assures that the two mirrors will remain parallel as a driving voltage is gradually increased. The resulting device can be driven in analog mode (e.g., cavity 511 may be driven by 5 volts to achieve partial deformation of the cavity) so that continuous variation of its spectral characteristics may be achieved.

Referring to FIGS. 21A and 21B, the modulation effect on incident radiation is shown. The binary modulation mode is shown in FIG. 21A. In the undriven state (shown on the left) incident light 512 (the delta lambda represents a range of incident frequencies, e.g., the range of visible light) contains a spectral component which is at the resonant frequency of the device in the undriven state. Consequently this component (delta lamba n) is transmitted, 516, and the remaining components (at nonresonant frequencies, delta lambda minus delta lamba n) are reflected, 514. This operation is in the nature of the operation of a fabry-perot interference cavity.

When the device is driven and the geometry altered to collapse (right side of figure), the resonant frequency of the device also changes. With the correct cavity dimensions, all of the incident light (delta lamba) is reflected.

FIG. 21A shows a binary mode of operation while FIG. 21B shows an analog mode, where a continuously variable voltage may be used to cause a continuously variable degree of translation of secondary mirror/conductor 506. This provides a mechanism for continuous frequency selection within an operational range because the resonant frequency of the cavity can be varied continuously. In the left side of FIG. 21A, the transmitted wavelengths are delta lambda n zero, while in the right hand side they are delta lambda n one.

The equations which explain the performance of the cavity are set forth at the bottom of FIG. 21B. Equation 1 defines the transmission T through a fabry-perot cavity. Ta, Tb, Ra, Rb are the transmittances and reflectances of the primary (a) and secondary (b) mirrors. Phi a and Phi b are the phase changes upon reflectance at the primary and secondary mirrors, respectively. Delta is the phase thickness. Equation 2 defines the phase thickness in terms of the cavity spacing ds, the index of refraction of the spacer ns, and the angle of incidence, theta s. Equation 3 shows that the transmission T becomes the transmission of the second mirror when the transmission of the first mirror approaches 0.

There are a number of particular frequency response modes which would be useful in applying the invention to displays. FIGS. 22A through 22F illustrate some of the possibilities and relate to the equations of FIG. 21B. These are idealized plots which illustrate transmission and reflectivity (T/R) of the cavity for wavelengths in the visible range in driven and undriven states for each of the driven and undriven response modes. The different modes are achieved by using different combinations of mirrors and cavity spacings.

The spectral characteristics of the mirrors used can be referred to as broad-band and narrow-band. The mirrors are optimized for the visible range with a broad band mirror operating across the entire visible range (i.e., reflecting over a minimum range of 400 nm to 700 nm). Such a mirror is denoted in the stack formula 1.671|0.775(ERS) 0.833M (ERS)|1.671 where ERS denotes an equal ripple filter. The ERS filter has layers which are a quarter wavelength thick, and their refractive indices are n0=1.671, n1=1.986, n2=1.663, n3=2.122, n4=1.562, n5=2.240, n6=1.495, n7=2.316, n8=1.460, n9=2.350, n10=1.450. A narrow-band filter optimized for the color green would reflect only over the range of 500 nm to 570 nm, and transmit everywhere else. Such a filter is described by the stack formula 1|C1 2C2 (3A/2 3B1 3A/2)2 (3A/2 3B 3A/2)6 (3A/2 3B1 3A/2)2|1.52 where the refractive indices are nA=0.156, nC2=nB1=1.93, and nB=2.34.

The cavity spacing (i.e., cavity height) in both driven and undriven states can be set to a predetermined value by the film thicknesses used in its construction. These two values determine whether a cavity is resonant or non-resonant. For a resonant cavity, the spacing is determined such that the undriven state coincides with the resonant peak of the narrower of the two mirrors. When a device is non-resonant, it must be driven in order for the device to become resonant.

For example, if the undriven cavity spacing were 535 nm then, because this coincides with the center of the previously defined narrow-band mirror, there would be a transmission peak at this frequency. Peak spacing for this cavity is 267 nm so the other peaks, which would occur in the standard Fabry-Perot fall outside of range of the narrow band mirror. This would be considered a resonant cavity because the peak occurs in the undriven state. Driving the cavity so that the spacing were 480 nm would result in no transmission peak because all of the cavity peaks are outside the range of the narrow-band mirror. For all practical purposes the narrow-band mirror does not exist at this frequency and therefore the transmission peak disappears.

FIG. 22A shows a T/R plot of a cavity having broad band mirrors on both layers of the cavity. When undriven, this results in transmission/reflection peaks which occur at wavelengths which are approximately integral multiples of the cavity spacing. (the notation m delta lambda n in FIG. 21A denotes the fact that there may be a series of peaks.) This is classic fabry-perot behavior. In the driven state (shown to the right in FIG. 22A), the cavity resonance is shifted out of the visible range causing the device to act like a broadband mirror.

FIG. 22B shows a T/R plot for a cavity having one broad band and one narrow band mirror. This device has a resonant cavity, causing a transmission peak at the center of the narrow-band mirror's passband when the device is in the undriven state. Driving the device (right hand side of FIG. 22B) shifts the cavity resonance away from that of the narrow band mirror, and the device acts like a broadband mirror.

In FIG. 22C, the cavity is like that of FIG. 22B, except the cavity is non-resonant which results in broadband mirror cavity behavior in the undriven state. When driven, the cavity spacing shifts into resonance, causing a transmission peak centered on the narrow-band mirror.

FIG. 22D shows the performance of a resonant cavity with two narrow-band mirrors. When undriven, there is a transmission peak centered on the mirrors' response. Since the mirrors are narrow-band, the overall cavity response is that of a broad-band transmitter. Driving the device out of resonance (i.e. active) results in a reflective peak at the narrow-band center frequency.

Like FIG. 22D, the cavity of FIG. 22E has two narrow band mirrors, but it is a non-resonant cavity. Consequently its behavior is opposite that of the cavity portrayed in FIG. 22D.

Thus, when one of the mirrors is narrow banded, mirror a for example, the transmission approaches zero for frequencies outside its range. This is essentially the transmission of mirror b. When both of the mirrors are narrow banded, the transmission becomes a maximum outside the frequency range. In either case, the spurious peaks typical of a fabry-perot are avoided. The result is a device which can be described as a single mode resonant cavity.

When both of the mirrors are narrow banded, then fabry-perot type behavior occurs only when the cavity spacing is correct. Making the mirrors narrow enough allows only a single peak to occur. Then it is unnecessary to be concerned about spurious peaks that might occur within the visible range.

FIG. 22F is for a cavity with a simpler design involving only a metallic mirror on one wall and a hybrid filter on the other wall. The hybrid filter is a combination of a narrow bandpass filter (outer surface) and an induced absorber (inner surface). The induced absorber is a simple structure which can consist of one or more dielectric or dielectric and metallic films. The function of the absorber is to cause incident light of a specified frequency range to be absorbed by a reflective surface (i.e. mirror). One such design can be achieved with a single film of refractive index n=1.65 and a thickness of 75.8 nm. The induced absorber only functions when it is in contact with the mirror, otherwise it is inconsequential.

In the undriven state, the hybrid filter (a green centered narrow bandpass/induced absorber) reflects everything but the green light, which is unaffected by the induced absorber and subsequently reflected by the metallic mirror. Thus the overall cavity response is like that of a broad-band mirror. When in the driven state, the hybrid filter comes into contact with the metallic mirror. The absorber couples the green light into the mirror, and the result is an absorption peak at that wavelength.

Referring to FIG. 23A, a red 3×3 pixel (i.e., 9 cavities) subtractive mode display array based on the cavity device using the N-N (narrow band-narrow band) configuration of FIG. 22D is shown. The cavity pixels are formed at the intersections of primary mirror/conductors 602 and secondary mirror/conductors 604. The display is fabricated on substrate 608 and driven via contact pads 606 connected to each conductor/mirror 604.

A full nine-pixel display comprises three replications of the array of FIG. 23A arranged on top of one another and fabricated on separate substrates or color planes 610, 612, 614, as shown in FIG. 23B. Each of the individual color planes interacts only with and reflects one color (e.g., red, green, or blue), while passing all other colors. This is done by selecting the mirror spectral characteristic and cavity spacing in each color plane appropriately. The color planes are physically aligned and electrically driven through the contact pads to produce full color images. The image would be viewed from below in FIG. 23B.

Referring to FIGS. 23C and 23D, a single layer composite approach is shown. Such a device would be more complicated to fabricate (though the mirror designs are simpler) but may suffer from inferior resolution. In this case, all three colors reside on the same array 616. Devices using either the B-B, B-N, N-N, or the M-F (B=broad band, N=narrow band, M=mirror, H-F=hybrid filter) configuration are used for this display.

Either the three plane or the single plane approach may be used in either transmissive and reflective modes. Pixel size and overall display size can be altered to make the displays useful in many different display and spatial light modulator applications. These include direct view and projection displays, optical computing, holographic memory, and any other situation where a one or two dimensional modulator of light can be used.

Because these structures depend on electrostatic attraction, which varies in an exponential fashion with cavity spacing, while the mechanical restoring force of the membrane varies linearly with cavity spacing, they exhibit hysteresis. As seen in FIG. 24A, the straight line labelled membrane tension shows that the restoring force on the membrane varies inversely linearly with distance (i.e., cavity spacing). That is, the smaller the spacing, the stronger the mechanical force tending to restore the original, at rest spacing. On the other hand, electrical attraction between the two layers of the cavity (the curved line) varies exponentially with smaller spacing, that is, as the two layers get closer there is an exponential increase in the attractive force between them. This causes a hysteresis effect as follows. With a low driving voltage applied, the secondary mirror/conductor experiences a displacement towards the substrate until the force of restoration balances the electrical attraction. However if the voltage is raised past a point known as a collapse threshold, the force of restoration is completely overcome and the membrane is pressed tightly against the substrate. The voltage can then be lowered again to some degree without affecting the position of the membrane. Only if the voltage is then lowered significantly or eliminated will the membrane be released. Because the membrane is under tensile stress, it will then pull itself away from the substrate when the voltage is released. This hysteresis can be used to achieve matrix addressing of a two-dimensional array, as explained with reference to FIG. 24B.

The display can be addressed and brightness controlled using control pulse sequences in the driving voltage. Shown is a timing diagram for a 3×3 pixel array analogous to that shown in FIG. 23A. During operation, a continuous series of −5 volts scanning pulses is applied to the rows (rows 1-3) of the pixel array in a sequential fashion, as seen in the charts labelled "Row". The pulses appear at the same frequency on each of the rows but the pulses for different rows are staggered. These pulses are insufficient in their own right to cause the membrane to collapse. The columns (cols. 1-3) of the pixel array (see charts labelled "Col) are maintained at a bias voltage of 5 volts so that the nominal voltage across each unactivated pixel is 5 volts. At times when the scan pulses are delivered to that pixel, the nominal row and column potentials are 5 and −5 volts respectively, resulting in a cavity voltage of 10 volts. With a 10 volts potential applied to the row and a −5 volts potential to the column, the total voltage across the cavity becomes 15 volts which is sufficient to drive the secondary mirror/conductor into the collapsed state, where it will remain until the end of the scan when all of the column voltages are pulsed to zero. The three charts at the bottom of FIG. 24B show the on and off states of the three pixels identified there by row and column numbers.

The intensity or brightness of a pixel may be varied by changing the fraction of the scan during which the pixel is activated. The scan cycle begins at 198 and ends at 199. The frequency of the scan pulses is such that six pulses of a given row fall within the scan cycle, providing an opportunity to activate a pixel at any one of six times during each cycle. Once the pixel is activated it stays on until the end of the cycle. Therefore six different intensities are possible for each pixel. For the scan shown, pixel C1R1 is at full brightness, pixel C2R2 is at 4/6 brightness, and pixel C3R2 is at 1/6 brightness. All pixels are cleared at the end of the scan and the cycle begins again. Since these structures can be driven at frequencies as high as 50 kHz, this method of brightness control is practical. Assuming six brightness levels, there would be a possibility of more than 8 thousand row scans per second.

Two processes for fabricating the arrays will be discussed; others may also be possible.

Figure 25A:
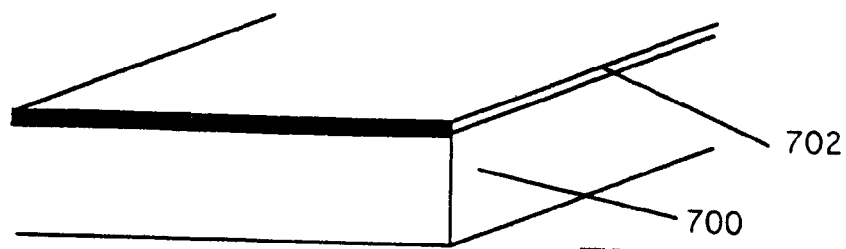

Referring to FIG. 25A, substrate 700 is first cleaned using standard procedures. The substrate may be of many different materials including silicon, plastic, mylar, or quartz. The primary requirement is that the material be able to support an optically smooth, though not necessarily flat, finish. A preferred material would likely be glass, which would permit both transmissive and reflective operation in the visible range.

The substrate is then coated with the primary conductor/mirror layer(s) 702. This can be achieved using a physical vapor deposition (PVD) method such as sputtering or e-beam evaporation. Other possible methods include chemical vapor deposition and molecular beam epitaxy. The dimensions and nature of the layer(s) depend on the specific configuration desired. Detailed examples are discussed below.

Figure 25B:
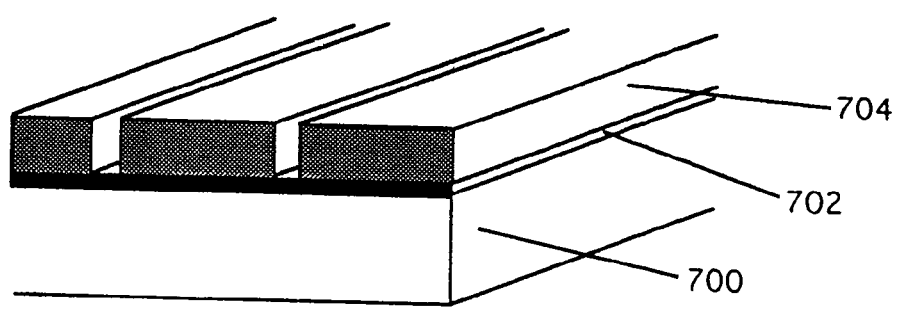

Referring to FIG. 25B, a photoresist 704 has been patterned on the primary conductor/mirror. The photoresist may be of a positive or negative type. The standard procedure for this step involves spinning of the resist, softbaking at 90 C, exposing through an appropriate mask, developing to produce the pattern, and hardbaking at 130 C.

Figure 25C:
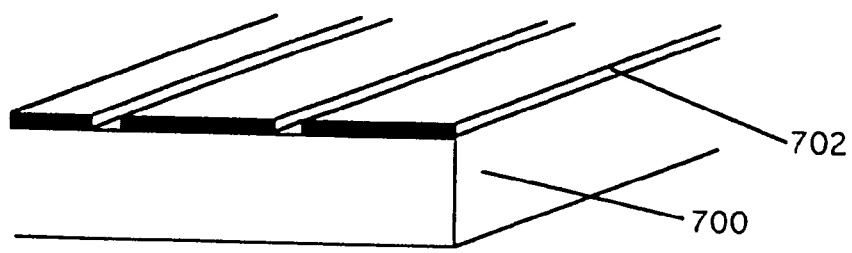
Figure 25D:
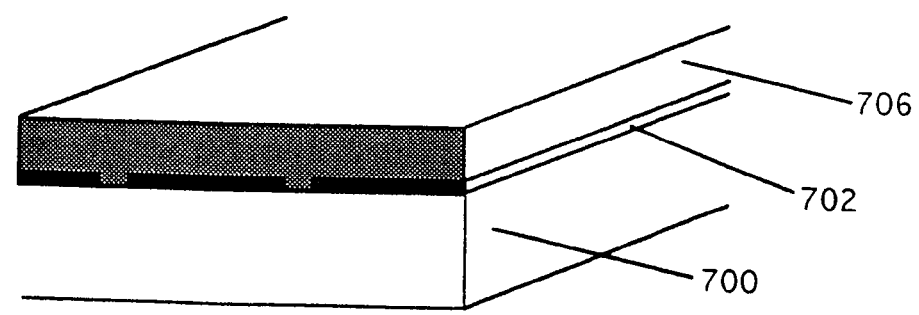

Referring to FIG. 25C, the photoresist pattern is defined in the primary conductor/mirror by an etching process. This step can be achieved either by wet chemical means or by plasma or reactive ion etching (RIE). The choice of etching technique depends on the nature of the conductor/mirror. In the case of an aluminum conductor/mirror, chlorine gas may be used to perform the etch, with a standard chamber power of 100 watts producing an etch rate of 100 angstroms/min. Some mirror materials may resist RIE and in such cases a technique such as ion milling may be used. All RIE steps are performed at a pressure of 30 mtorr unless otherwise noted. All plasma etch steps are performed at a pressure of 100 mtorr unless otherwise noted. The photoresist is removed using standard solvents.

Alternatively, the conductor/mirror may be defined using the well-known procedure called lift-off. This procedure is used to define a layer in a subsequent step and is described below.

Referring to FIG. 25B, support rail material 706, has been deposited using one of the methods mentioned previously. This material should be an insulator, for example silicon dioxide or silicon nitride. The material should be deposited uniformly, and at a thickness equal to thickness of the spacer layer, which will be deposited later. This thickness should in general be at least a multiple of the wavelength of light of interest. A thickness of 0.5 microns would place such a device near the middle of the visible spectrum.

Figure 25E:
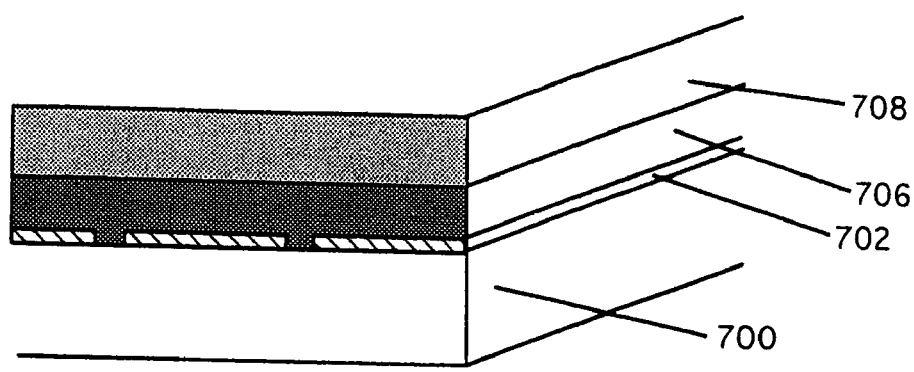

Referring to FIG. 25E, photoresist layer 708 is spun on and hardbaked. Since this layer will not be photolithographically defined, other polymeric materials may be used instead. The only requirement is that they dissolve in solvents such as acetone or methanol, and be able to withstand a vacuum. This is the first step in defining a lift-off stencil.

Figure 25F:
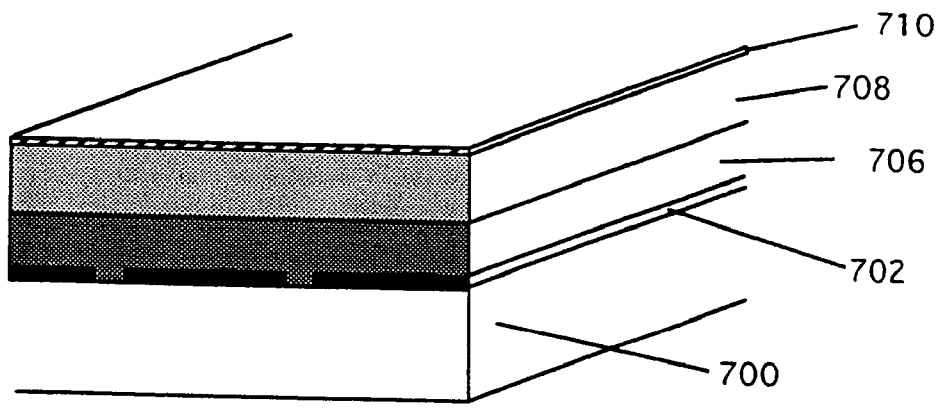

Referring to FIG. 25F, template layer 710 has been deposited using one of the methods of PVD. The layer is of silicon dioxide though other materials are possible. Ideally the material should be etched using a process which does not affect the underlying resist. Buffered Oxide Etch (BOE) which consists of Hydrofluoric acid diluted 7:1 with water can perform this step in 15 seconds. The layer need only be a thousand angstroms thick.

Figure 25G:
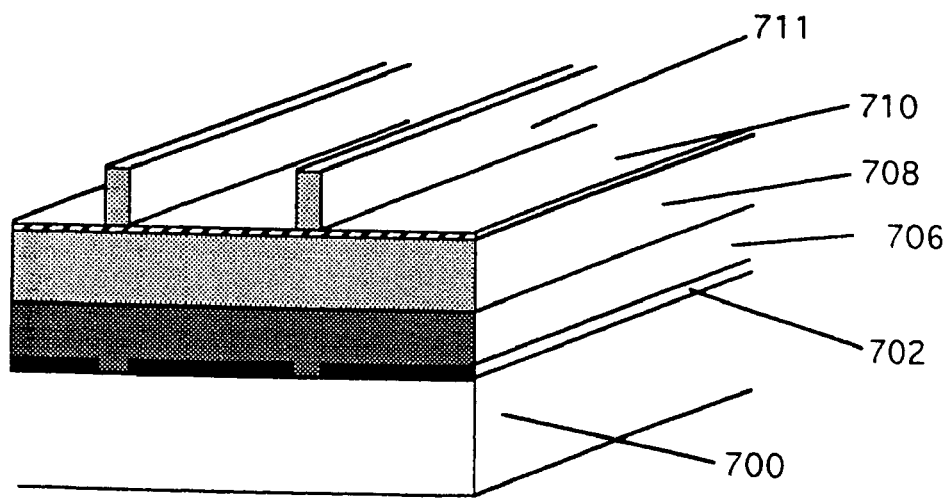

In FIG. 25G, photoresist layer 712 has been spun-on and patterned in a manner already discussed.

Figure 25H:
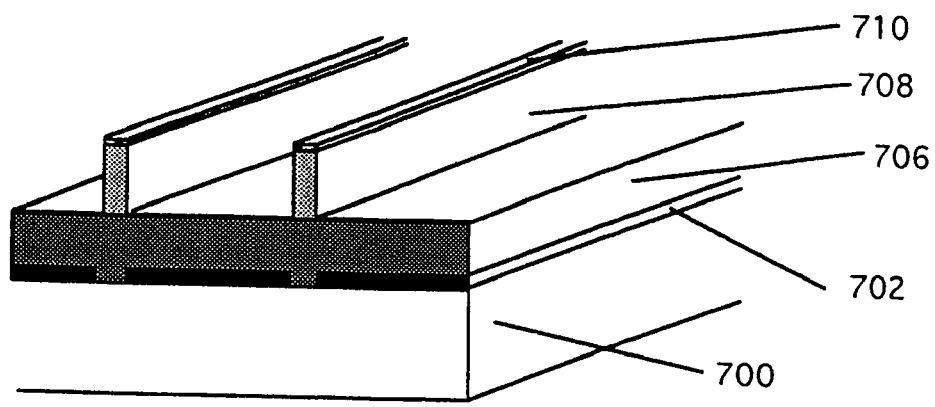

Referring to FIG. 25H, using a combination of BOE and RIE, the pattern of resist layer 711 has been transferred to layers 710 and 708. In the first step, the BOE is used to etch through the silicon dioxide layer 710. An oxygen plasma is used to etch through resist layer 708, and to remove resist layer 711. Plasma etching differs from RIE in that it tends to be less anisotropic, yielding profiles that are not purely vertical.

Figure 25I:
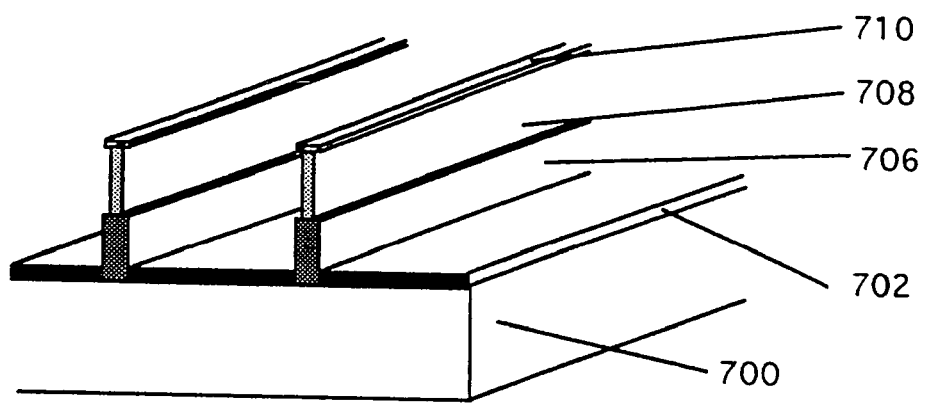

Referring to FIG. 25I, using an oxygen plasma, resist layer 708 has been slightly underetched in order to facilitate removal of the lift-off stencil. RIE using a carbon tetrafluoride chemistry (CF4/O2 6:4) is then applied to etching through layer 706.

Figure 25J:
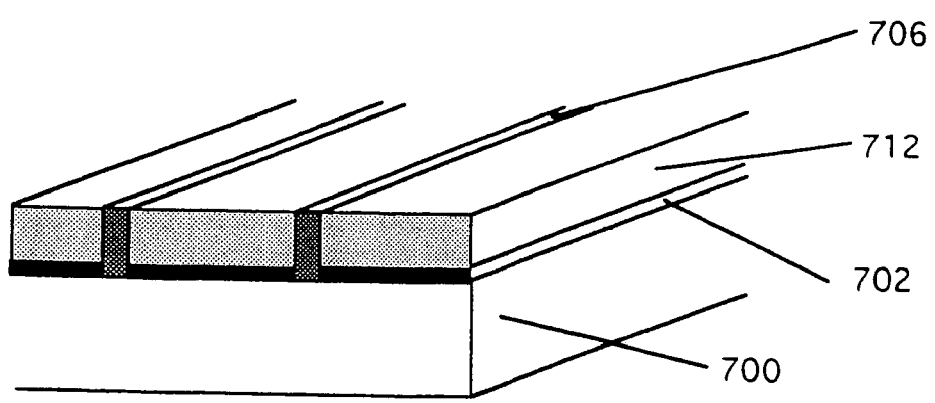

Referring to FIG. 25J, spacer layer 712 is deposited using PVD techniques. This material can be any number of different compounds which can be deposited using this technique. There are two key requirements for such a material. The first is that the material be soluble in water but not in solvents such as acetone or methanol. Example materials include lithium fluoride, aluminum fluoride, and sodium chloride. The second is that it be deposited with extreme uniformity and thickness control.

The former allows resulting structures to be underetched without damage by using water as the final etchant. Water is an extremely benign solvent, and makes possible the incorporation of many different mirror, conductor, and structural materials in the final device.

The latter insures that subsequent layers conform to the variations of the substrate and therefore primary conductor/mirror. This parallelism is essential for the optical behavior of the resonant cavity devices.

The spacer may also be composed of a polymeric material such as hardbaked photoresist or polyimide. To achieve the required thickness uniformity, a technique other than spinning must be used to deposit the polymer. Two such techniques include extrusion and capillary coating. The consequence of using such a spacer is that all subsequent process steps must be low temperature in nature to prevent outgassing and shrinkage of this layer. In this case, the spacer is ultimately removed using an oxygen plasma.

The stencil is subsequently removed using an ultrasonic acetone bath and methanol rinse. This also removes or lifts off excess deposited spacer material and is what constitutes the final step of the lift-off process.

Alternatively, by using negative photoresist and an oppositely polarized mask, a natural overhang may be produced via overexposure. The same may be accomplished with positive photoresist using a technique known as image-reversal. This would preclude the need to put down a sacrificial photoresist layer and a subsequent SiO2 layer.

Figure 25K:
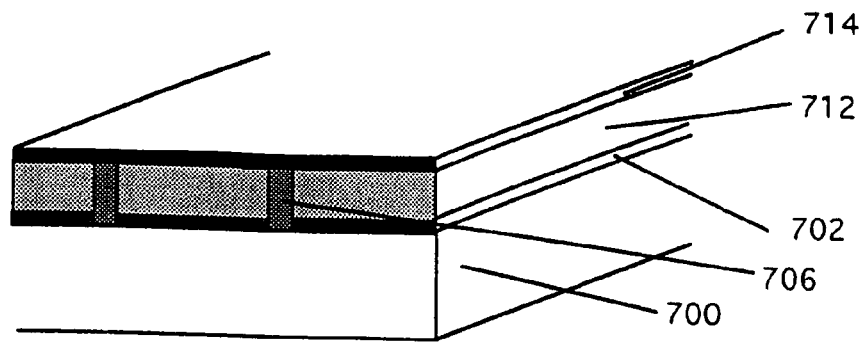

Referring to FIG. 25K, secondary conductor/mirror layer (s) and support membrane (714) are deposited. The nature of the conductor/mirror is dependent on the application. The support membrane must have a tensile residual stress. Tensile stress is required for two reasons. First so that the resulting membranes will be flat and therefore parallel to the substrate in the quiescent state. Secondly, such structures have a tendency to stick when the membranes come in contact with the substrate. Sufficient tensile stress is required pull the membrane away when the drive voltage is reduced.

The membrane must have the appropriate optical characteristics as well. For visible light this would mean transparency in the visible region. Silicon nitride is one candidate for this role for it can be deposited using plasma enhanced chemical vapor deposition (PECVD) with controlled stress. Other candidates include silicon dioxide, magnesium fluoride and calcium fluoride, all of which can be deposited using e-beam evaporation with a resulting tensile stress.

Figure 25L:
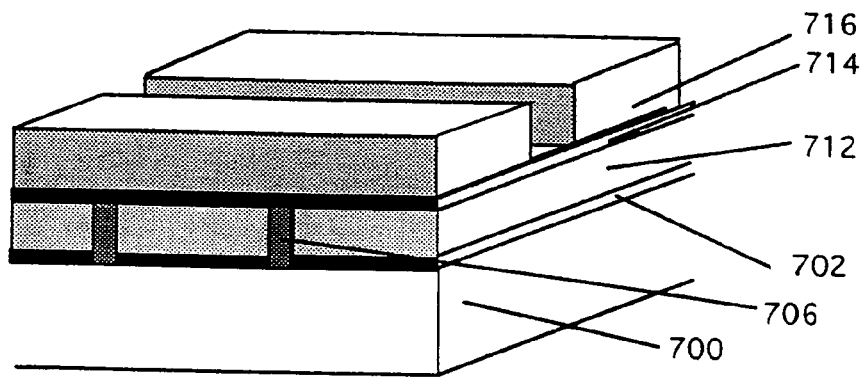

In FIG. 25L, photoresist layer 716 has been spun-on and patterned in a manner discussed above.

Figure 25M:
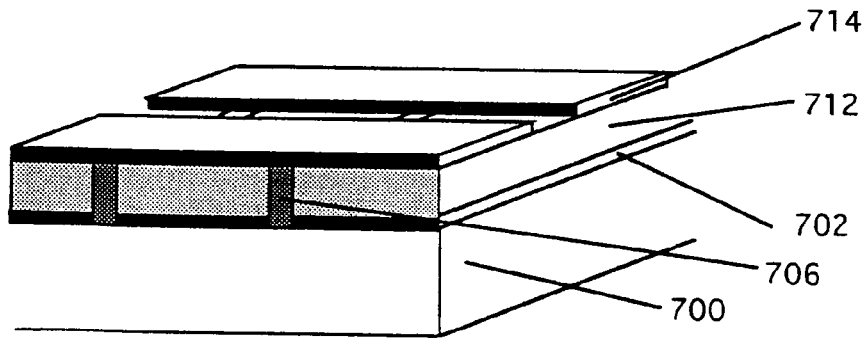

In FIG. 25M, using RIE or ion milling, layer(s) 714 have been etched according to the pattern of resist layer 716.

Figure 25N:
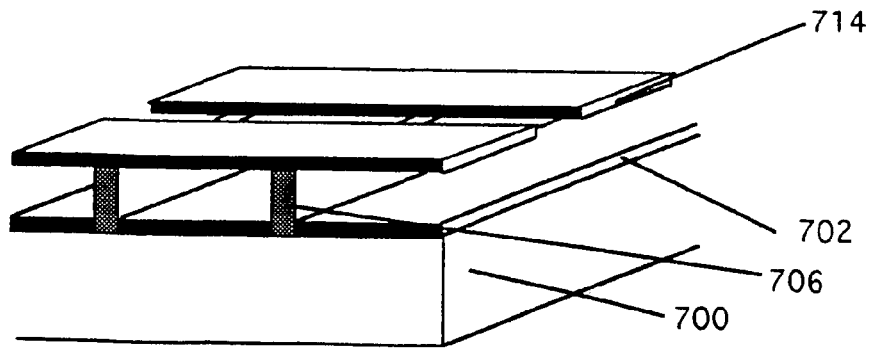

Referring to FIG. 25N, the final etch is accomplished by placing the device in water for a period of time. The water is agitated, and when the devices are fully etched they are dried.

One variation on this step involves the use of n-butyl alcohol to displace the water when the etch is finished. The devices are then placed in a chamber at approximately 32 degrees centigrade to cause the alcohol to freeze. After this step the devices are placed into a vacuum chamber where the air is then evacuated. This causes the alcohol to sublime and can reduce membrane sticking during the drying phase.

Figure 26A:
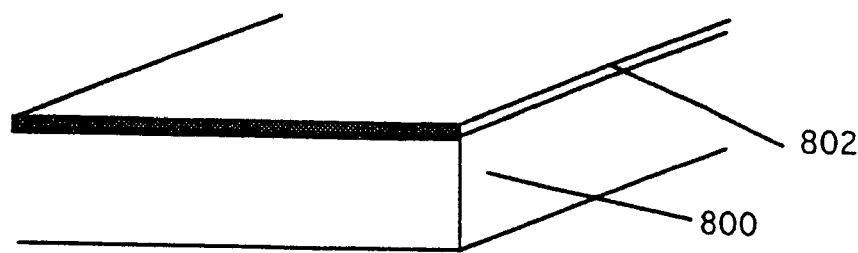
Figure 26B:
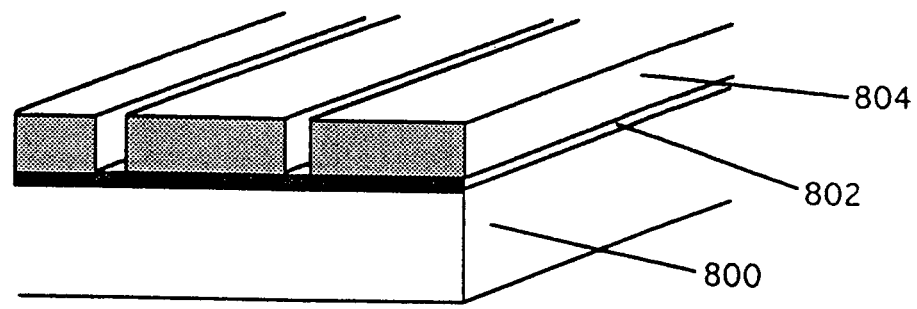
Figure 26C:
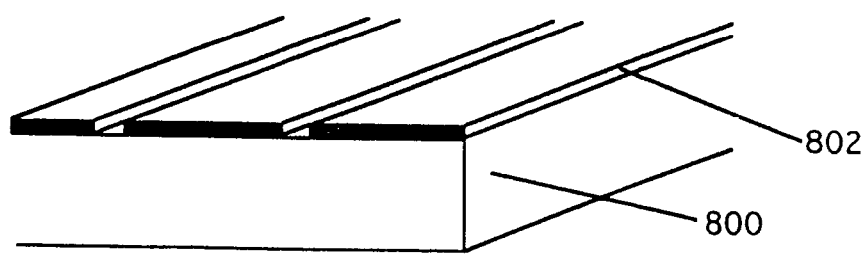

Another alternative process has initial steps of assembly shown in FIGS. 26A through 26C, analogous to those shown in FIGS. 25A through 25C.

Figure 26D:
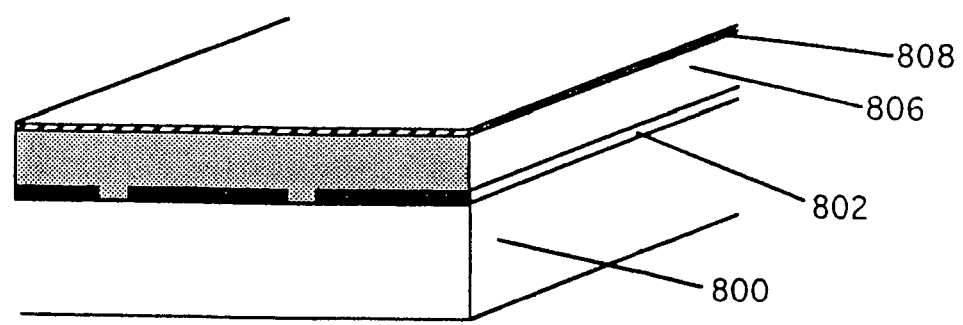

Thereafter, in FIG. 26D, photoresist or polymer layer 806 is spun on and a stencil layer, 208, of silicon dioxide is deposited using PVD. This layer must be thicker than the spacer layer to be deposited.

Figure 26E:
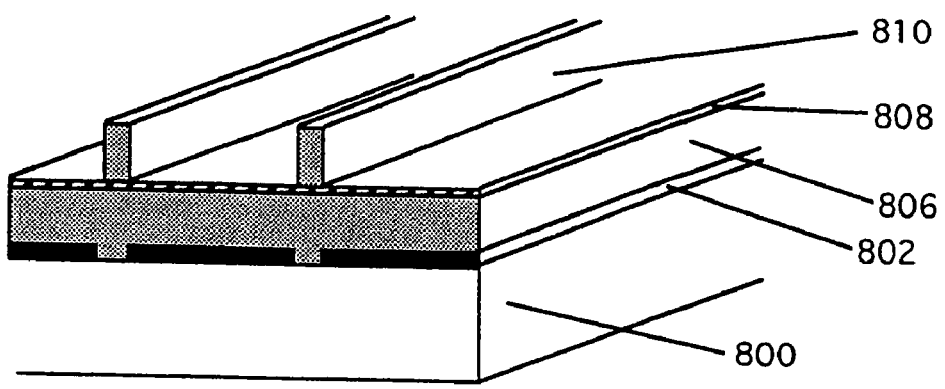

In FIG. 26E, resist layer 810 has been spun-on and patterned using standard procedures.

Figure 26F:
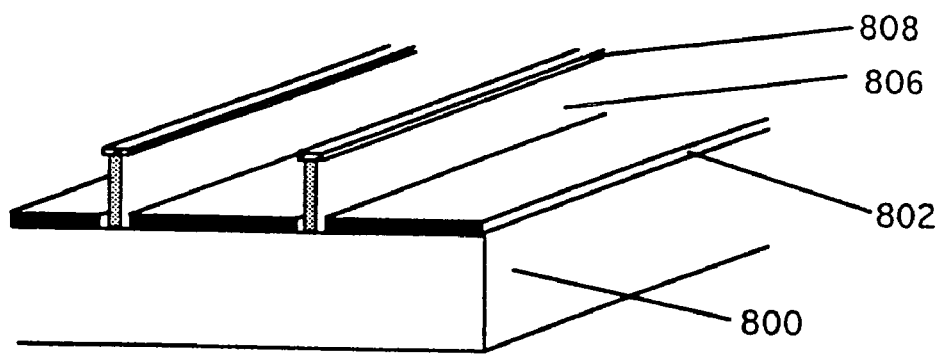

In FIG. 26F, this step uses BOE and an oxygen plasma etch to define a lift-off stencil.

Figure 26G:
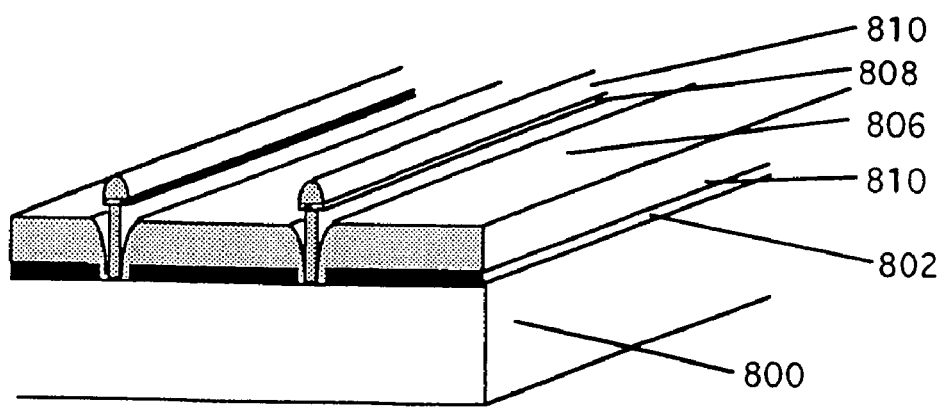

In FIG. 26G, the spacer material is chosen and deposited as described in FIG. 25J.

Figure 26H:
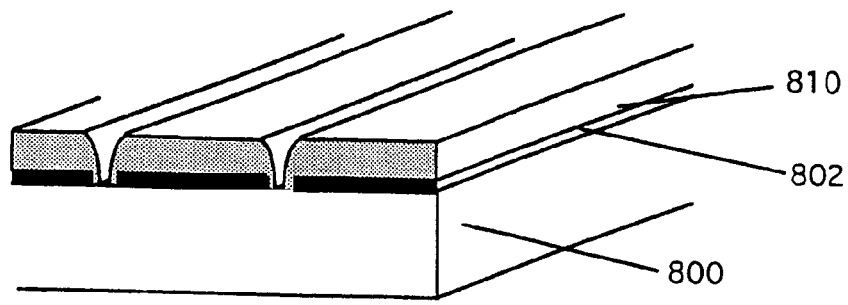

In FIG. 26H, the stencil is subsequently removed using an ultrasonic acetone bath and methanol rinse.

Figure 26I:
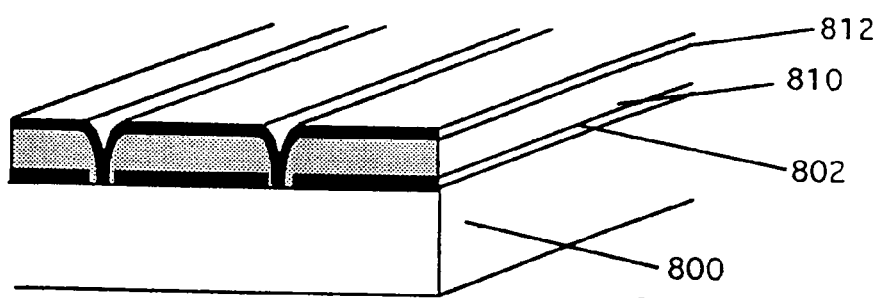

The step shown in FIG. 26I is analogous to that shown in FIG. 25K.

Figure 26J:
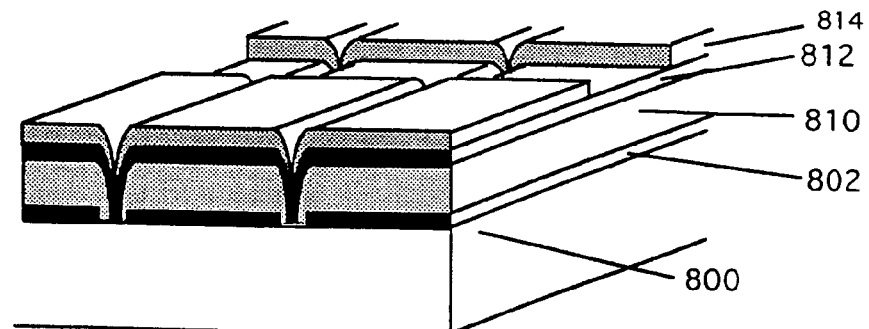

In FIG. 26J, photoresist layer 814 has been spun-on and patterned.

Figure 26K:
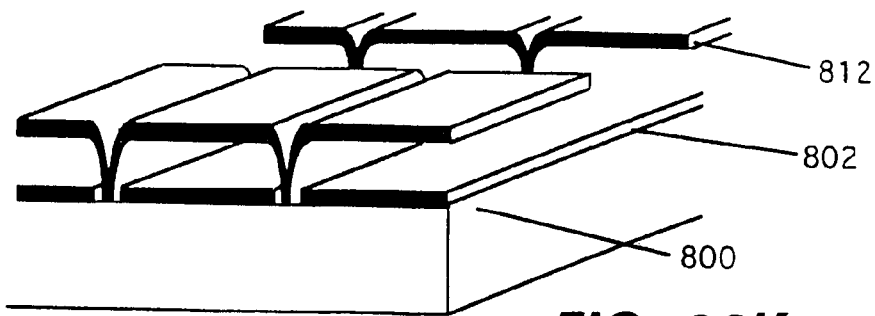

In FIG. 26K, using RIE or ion milling, layer(s) 812 have been etched according to the pattern of resist layer 214.

The final etch is accomplished in a manner described above.

All of the materials used for the mirrors must be deposited in such a way that their stress can be controlled. Ideally, they are deposited as "stress balanced" which means that the overall stress of the film or film stack is zero. Since the ultimate goal is that the support membrane conductor/mirror combination have an overall tensile stress, conductor/mirror films with compressive stress may be accommodated by having a high stress support membrane. The technique of ion assisted e-beam deposition (IABD) precludes the need for such accommodation. Using this technique, the residual stress of almost any film of interest may be controlled by bombarding the substrate with a stream of neutral ions during the deposition process. This make possible the total mechanical decoupling of the support material from the optical material. As a result, emphasis can be placed on depositing an optically neutral support membrane with ideal mechanical characteristics. In the same manner, a "mechanically neutral" (i.e. stressless) conductor/mirror can be deposited with ideal optical characteristic.

Referring to FIG. 27A, the simplest conductor/mirror configuration for an individual cavity is formed from a layer 900 that is either the substrate for the primary conductor/mirror, or the support membrane if this is the secondary. Layer 902 is a metallic film with a thickness on the order of several hundred angstroms. The film can be of aluminum, silver, or any number of metals, based on the spectral, and resistive properties as well as the ease with which the metal can be etched.

The use of a metal as both mirror and conductor simplifies fabrication. Unfortunately the spectral characteristics of the metallic layer cannot be tailored, and the performance limits devices to very specific kinds of behavior. Layer 904 is an insulator and/or reflection enhancement film. This can be formed by oxidizing the metal, if aluminum is being used, in an oxygen plasma thus forming a thin layer of aluminum oxide. Alternatively, insulating layers or reflection enhancement layers may be deposited in a manner discussed before. Metallic mirrors must be somewhat transmissive and therefore no more than several hundred angstroms thick. Insulator films can have thicknesses from one hundred to several thousand angstroms. Their thickness is determined by the kind of voltages expected in driving the devices.

Referring to FIG. 27B, a more elaborate configuration is shown. This is a compound conductor/mirror, with layer 900 as the substrate or the support membrane. The conductor 906 is either a transparent film such as indium tin oxide (ITO), or a very thin metallic layer such as gold. Either can be deposited using suitable film deposition methods. Thicknesses for the ITO should be in the range of several thousand angstroms, and metallic conductors less than 100 angstroms. 908 is a multilayer dielectric stack comprising the mirror. Such a mirror consists of alternating dielectric films with differing indexes of refraction deposited by a suitable PVD process. By choosing films with appropriate thicknesses and indexes, mirrors with tailorable spectral characteristics can be fabricated as is well known in the art. In general, the thickness of the individual layers is one quarter the wavelength of the light of interest.

Alternatively, these mirrors may be deposited using a technique known as codeposition. In this case, PVD is used to deposit two materials with different refractive indices simultaneously. Using computer control the refractive index of the resulting film can be varied continuously between those of either film. This deposition technique makes possible mirrors with virtually any spectral characteristic.

The ability to design the characteristics of this mirror allow for devices with a greater variety of modes of operation. Unfortunately, because the conductive layer is not perfectly transparent, additional losses are incurred as a result.

Referring to FIGS. 27C and 27D, a dielectric mirror 908 is deposited directly on substrate 900. Metallic conductor 902 and insulator 904 are deposited and patterned such that they form a border around the periphery of the mirror. Using this configuration, it is possible to provide drive voltages to the devices without compromising throughput since the conductor can be placed outside the active area of the device. FIG. 27D shows a planar view of this mirror configuration.

Response times of this device may suffer as a result of decreased conductor area.

Referring to FIG. 28a, a linear tunable filter is shown which has been fabricated using the process sequence defined above. The major difference is the nature of the mask used to define the self-supporting membrane, which is comprised of support 1006 and 1008. The substrate, 1000, is transparent in the frequency region of interest, and electrodes 1004 are used to drive the device. Dielectric mirror 1002 are defined separately to produce a configuration like that of FIGS. 27c, 27d. Three filters are shown though many more can be fabricated. Each filter 1010, 1012, and 1014 is driven independently so that individual frequencies may be separated from an incident light beam. Such a device can find use in spectroscopic analysis, as a demultiplexor in a wavelength division multiplexed fiber optic communication system, a color printer, or any other application where independent frequency selection is required. FIG. 28b is a top view of the structure.

Referring to FIGS. 29a and 29b, a device known as a deformable mirror includes a self-supporting membrane 1102 fabricated on a substrate 1100. When a potential is applied between actuator electrodes 1104 and conducting mirror 1106, the surface of the mirror can be deformed in a controllable manner. Such a device can be used as a component in an adaptive optics system, or in any situation where control of an incident wavefront is required.

Other embodiments are within the scope of the following claims.

What is claimed is:

1. An electronic device for at least partially displaying a pixel of a displayable image comprising:
   a first reflector and a second reflector defining an optical cavity therebetween selective of a visible wavelength at an intensity by optical interference; and,
   a charge-controlling mechanism to allow optical properties of the optical cavity to be varied by controlling an amount of charge stored on the first and the second reflectors such that at least one of the visible wavelength and the intensity are variably selectable in correspondence with the pixel of the displayable image.

2. The electronic device of claim 1, wherein the mechanism comprises a charge-sharing capacitor.

3. The electronic device of claim 2, wherein the mechanism further comprises a voltage source and a second capacitor in parallel with the first reflector and the second reflector, the mechanism switching between the voltage source and the charge-sharing capacitor, the second capacitor, the first reflector, and the second reflector.

4. The electronic device of claim 1, wherein the mechanism comprises a controlled current source and circuitry for controlling a time interval that the current source is applied to the first reflector and the second reflector.

5. The electronic device of claim 1, wherein the first reflector is a top, semi-reflective reflector, and the second reflector is a bottom, highly reflective reflector.

6. The electronic device of claim 1, wherein the mechanism allows a thickness of the optical cavity to be varied to variably select at least one of the visible wavelength and the intensity.

7. The electronic device of claim 1, wherein the mechanism comprises a flexure operatively coupled to one of the first and the second reflectors.

8. The electronic device of claim 7, wherein the flexure is a non-linear flexure that has non-linear spring functionality.

9. The electronic device of claim 1, wherein the optical cavity operates in accordance with a contact mode in which the first and the second reflectors come into contact with one another, and a non-contact mode in which the first and the second reflectors are separated from one another, such that a thickness of the optical cavity therebetween is controllable by the mechanism to select color.

10. The electronic device of claim 1, wherein the optical cavity has a sufficiently great thickness to produce an order of spectral response of a color corresponding to the visible wavelength that is greater than one.

11. The electronic device of claim 1, further comprising a third reflector between the first reflector and the second reflector such that the optical cavity encompasses a first gap between the first reflector and the third reflector and a second gap between the third reflector and the second reflector.

12. The electronic device of claim 1, wherein both the visible wavelength and the intensity are variably selectable in correspondence with the pixel of the displayable image.

13. The electronic device of claim 1, wherein the optical cavity is operates in accordance with multiple levels, each level corresponding to at least one of a different color and a different intensity of the different color.

14. The electronic device of claim 1, wherein the visible wavelength of which the optical cavity is selective is fixed as a color component wavelength, and the intensity of the color component wavelength is variably selectable in correspondence with a corresponding color component of the pixel of the displayable image.

15. The electronic device of claim 1, wherein the optical cavity is one of reflectively selective and transmissively selective.

16. An electronic device for at least partially displaying a pixel of a displayable image comprising:
a first reflector and a second reflector defining an optical cavity therebetween selective of a visible wavelength at an intensity by optical interference; and,
means for controlling an amount of charge stored on the first and the second reflectors to vary optical properties of the optical cavity to variably select at least one of the visible wavelength and the intensity in correspondence with the pixel of the displayable image.

17. The electronic device of claim 16, wherein a thickness of the optical cavity is variable.

18. The electronic device of claim 16, further comprising a non-linear flexure having non-linear spring functionality.

19. The electronic device of claim 16, wherein the optical cavity is operable in a contact mode in which the first and the second reflectors come into contact with one another, and a non-contact mode in which the first and the second reflectors are separated from one another.

20. The electronic device of claim 16, wherein the optical cavity has a sufficiently great thickness to produce an order of spectral response of a color corresponding to the visible wavelength that is greater than one.

21. The electronic device of claim 16, further comprising a third reflector between the first reflector and the second reflector such that the optical cavity encompasses a first gap between the first reflector and the third reflector and a second gap between the third reflector and the second reflector.

22. The electronic device of claim 16, wherein the optical cavity is operable in accordance with multiple levels, each level corresponding to at least one of a different color and a different intensity of the different color.

23. A display device comprising:
a plurality of electrically adjustable optical resonant cavities to correspondingly display a plurality of pixels of a displayable image by optical interference such that the plurality of cavities are divided into a plurality of cavity groups, each cavity group variably selecting a visible wavelength at an intensity corresponding to a color and an intensity of a corresponding pixel of the displayable image; and
at least one charge-controlling mechanism to allow optical properties of the optical resonant cavities to be varied by controlling an amount of charge stored over the cavities.

24. The display device of claim 23, wherein each cavity group comprises a sub-plurality of the plurality of cavities, each cavity of the sub-plurality of each cavity group selecting a different static color wavelength at a variably intensity corresponding to a different color component of a pixel of the displayable image to which the cavity group corresponds.

25. The display device of claim 23, wherein each of at least one of the plurality of cavities operates in three different states.

26. The display device of claim 23, wherein the plurality of cavities are each of one of a plurality of types, each of the plurality of types having three different operable states.

27. The display device of claim 23, wherein each cavity group comprises a red wavelength-selecting cavity selecting a red intensity corresponding to a red color component of a pixel of the displayable image to which the cavity group corresponds, a green wavelength-selecting cavity selecting a green intensity corresponding to a green color component of a pixel of the displayable image to which the cavity group corresponds, and a blue wavelength-selecting cavity selecting a blue intensity corresponding to a blue color component of a pixel of the displayable image to which the cavity group corresponds.

28. The display device of claim 23, further comprising, for each optical resonant cavity, a first reflector and a second reflector defining the optical resonant cavity therebetween, and a flexure operatively coupled to one of the first and the second reflectors.

29. The display device of claim 28, wherein the flexure has a non-linear spring functionality.

30. The display device of claim 28, wherein each optical resonant cavity is operable in a contact mode in which the first and the second reflectors come into contact with one another, and a non-contact mode in which the first and the second reflectors are separated from one another.

31. The display device of claim 28, wherein each optical resonant cavity has a sufficiently great thickness to produce an order of spectral response greater than one.

32. The display device of claim 28, further comprising, for each optical resonant cavity, a third reflector between the first and the second reflectors, such that each optical resonant cavity encompasses a first gap between the first and the third reflectors and a second gap between the third and the second reflectors.

33. An electronic device for at least partially displaying a pixel of a displayable image comprising:
  a first reflector, a second reflector, and a third reflector in between the first and the second reflectors defining an optical cavity inclusive of a first gap between the first reflector and the third reflector, and a second gap between the second reflector and the third reflector, the optical cavity selective of a visible wavelength at an intensity by optical interference; and,
  a mechanism to allow optical properties of the optical cavity to be varied by controlling an amount of charge stored over the cavity such that at least one of the visible wavelength and the intensity are variably selectable in correspondence with the pixel of the displayable image.

34. The electronic device of claim 33, wherein both the visible wavelength and the intensity are variably selectable in correspondence with the pixel of the displayable image.

35. The electronic device of claim 33, wherein the optical cavity operates in accordance with multiple levels, each level corresponding to at least one of a different color and a different intensity of the different color.

36. The electronic device of claim 33, wherein the visible wavelength of which the optical cavity is selective is fixed as a color component wavelength, and the intensity of the color component wavelength is variably selectable in correspondence with a corresponding color component of the pixel of the displayable image.

37. The electronic device of claim 33, wherein the optical cavity is one of reflectively selective and transmissively selective.

38. A display device comprising:
  a plurality of electrically adjustable optical resonant cavities to correspondingly display a plurality of pixels of a displayable image by optical interference,
  wherein the plurality of cavities are divided into a plurality of cavity groups, each cavity group variably selecting a visible wavelength at an intensity corresponding to a color and an intensity of a corresponding pixel of the displayable image.

39. The display device of claim 38, wherein each cavity group comprises a sub-plurality of the plurality of cavities, each cavity of the sub-plurality of each cavity group selecting a different static color wavelength at a variably intensity corresponding to a different color component of a pixel of the displayable image to which the cavity group corresponds.

40. The display device of claim 38, wherein each of at least one of the plurality of cavities operates in three different states.

41. The display device of claim 38, wherein the plurality of cavities are each of one of a plurality of types, each of the plurality of types having three different operable states.

42. The display device of claim 38, wherein each cavity group comprises a red wavelength-selecting cavity selecting a red intensity corresponding to a red color component of a pixel of the displayable image to which the cavity group corresponds, a green wavelength-selecting cavity selecting a red intensity corresponding to a green color component of a pixel of the displayable image to which the cavity group corresponds, and a blue wavelength-selecting cavity selecting a red intensity corresponding to a blue color component of a pixel of the displayable image to which the cavity group corresponds.

43. The display device of claim 38, further comprising at least one charge-controlling mechanism to allow optical properties of the optical resonant cavities to be varied by controlling an amount of charge stored over the cavities.

44. The display device of claim 38, further comprising, for each optical resonant cavity, a first reflector and a second reflector defining the optical resonant cavity therebetween, and a flexure operatively coupled to one of the first and the second reflectors.

45. The display device of claim 44, wherein the flexure has a non-linear spring functionality.

46. The display device of claim 4, wherein each optical resonant cavity is operable in a contact mode in which the first and the second reflectors come into contact with one another, and a non-contact mode in which the first and the second reflectors are separated from one another.

47. The display device of claim 44, wherein each optical resonant cavity has a sufficiently great thickness to produce an order of spectral response greater than one.

48. The display device of claim 44, further comprising, for each optical resonant cavity, a third reflector between the first and the second reflectors, such that each optical resonant cavity encompasses a first gap between the first and the third reflectors and a second gap between the third and the second reflectors.

49. An electronic device for at least partially displaying a pixel of a displayable image comprising:
  a first reflector, a second reflector, and a third reflector in-between the first and the second reflectors defining an optical cavity inclusive of a first gap between the first reflector and the third reflector, and a second gap between the second reflector and the third reflector, the optical cavity selective of a visible wavelength at an intensity by optical interference; and,
  a mechanism to allow optical properties of the optical cavity to be varied, such that at least one of the visible wavelength and the intensity are variably selectable in correspondence with the pixel of the displayable image.

50. The electronic device of claim 49, wherein both the visible wavelength and the intensity are variably selectable in correspondence with the pixel of the displayable image.

51. The electronic device of claim 49, wherein the optical cavity operates in accordance with multiple levels, each level corresponding to at least one of a different color and a different intensity of the different color.

52. The electronic device of claim 49, wherein the visible wavelength of which the optical cavity is selective is fixed as a color component wavelength, and the intensity of the color component wavelength is variably selectable in correspondence with a corresponding color component of the pixel of the displayable image.

53. The electronic device of claim 49, wherein the optical cavity is one of reflectively selective and transmissively selective.

* * * * *